US010223749B2

(12) United States Patent
Greenshields et al.

(10) Patent No.: US 10,223,749 B2
(45) Date of Patent: Mar. 5, 2019

(54) RETIREMENT PLANNING METHOD

(71) Applicant: Frank Russell Company, Seattle, WA (US)

(72) Inventors: Rod Steven Greenshields, Tacoma, WA (US); Grant Walter Gardner, Tacoma, WA (US); Samuel David Pittman, Issaquah, WA (US); Steven M. Murray, Edgewood, WA (US); Yuan-An Fan, Puyallup, WA (US)

(73) Assignee: RUSSELL INVESTMENTS GROUP INC., Olympia, WA (US)

( * ) Notice: Subject to any disclaimer, the term of this patent is extended or adjusted under 35 U.S.C. 154(b) by 0 days.

(21) Appl. No.: 14/074,393

(22) Filed: Nov. 7, 2013

(65) Prior Publication Data

US 2014/0143175 A1 May 22, 2014

Related U.S. Application Data

(60) Provisional application No. 61/724,809, filed on Nov. 9, 2012.

(51) Int. Cl.
*G06Q 40/06* (2012.01)
(52) U.S. Cl.
CPC .................................. *G06Q 40/06* (2013.01)
(58) Field of Classification Search
CPC .................................................. G06Q 40/00
USPC .......................................................... 705/36
See application file for complete search history.

(56) References Cited

U.S. PATENT DOCUMENTS

| 8,903,739 B1* | 12/2014 | Janiczek | G06Q 40/00 |
| | | | 705/325 |
| 8,909,540 B1* | 12/2014 | Greenbaum | G06Q 40/08 |
| | | | 705/35 |
| 2010/0004957 A1* | 1/2010 | Ball | G06Q 40/08 |
| | | | 705/4 |
| 2010/0131425 A1* | 5/2010 | Stolerman | G06Q 10/067 |
| | | | 705/36 R |
| 2014/0143175 A1* | 5/2014 | Greenshields | G06Q 40/06 |
| | | | 705/36 R |

(Continued)

OTHER PUBLICATIONS

FHA.com. Debt Ratio and Debt-to-Income Ratio. http://www.fha.com/define/debt-ratio. Jan. 8, 2017.*

(Continued)

*Primary Examiner* — Bruce I Ebersman
(74) *Attorney, Agent, or Firm* — Davis Wright Tremaine LLP; Heather M. Colburn

(57) ABSTRACT

Retirement planning methods and systems for use with an individual investor having a retirement plan comprising assets and future liabilities. One or more computing devices perform the methods. Embodiments of the methods include determining a net present value of the assets and a net present value of the future liabilities. A funded ratio is calculated as a function of the net present value of the assets and the net present value of the future liabilities. If the funded ratio is less than a predetermined threshold value, the retirement plan is at risk of being underfunded. If the funded ratio is greater than the predetermined threshold value, the retirement plan is not at risk of being underfunded. An indication may be displayed indicating whether the retirement plan is at risk of being underfunded.

31 Claims, 19 Drawing Sheets

(56) References Cited

U.S. PATENT DOCUMENTS

2014/0207638 A1* 7/2014 Janiczek ................ G06Q 40/00
705/35

OTHER PUBLICATIONS

What happens if you outlif your safe withdrawl rate horizon, https:/www.kitces.com/blog/what-happens-if-you-outlive-your-safe-withdrawal-rate-time . . . (7 pages, Jun. 20, 2011) (Year: 2011).*

* cited by examiner

| USER INPUT | | |
|---|---|---|
| MARITAL STATUS: | ☑ MARRIED ☐ SINGLE | |
| NAME: | JACK HOLMES | JUDY HOLMES |
| GENDER: | MALE | FEMALE |
| AGE: | 61 | 62 |
| TIME TO RETIREMENT: | 6 MONTHS | |
| RETIREMENT SAVINGS: | $760,000 | |
| PRE-RETIREMENT ANNUAL INCOME: | $100,000 | |
| CONTRIBUTION: | 30% | |
| POST-RETIREMENT ANNUAL INCOME: | $38,000 | |
| | ESSENTIAL PLAN | LIFESTYLE PLAN |
| ANNUAL SPENDING: | $60,000 | $72,000 |

SUBMIT

280

RESULTS

|  | ESSENTIAL PLAN | LIFESTYLE PLAN |
|---|---|---|
| NET PRESENT VALUE OF LIABILITIES: | $510,591 | $789,095 |

NET PRESENT VALUE OF ASSETS:
- FINANCIAL ASSETS: $760,000
- HUMAN CAPITAL ASSETS: $15,000
- TOTAL ASSETS: $775,000

|  | ESSENTIAL PLAN | LIFESTYLE PLAN |
|---|---|---|
| FUNDED RATIO: | 1.52 | 0.98 |
| SURPLUS: | $264,400 | -$14,100 |
|  | ON TRACK | OFF TRACK |

[ADJUST PLAN] [COMPARE INVESTMENT STRATEGIES]

FIGURE 2C

| INVESTMENT STRATEGIES | | | |
|---|---|---|---|
| | PROPOSED PLAN | TRADITIONAL ASSET ALLOCATION PLAN | ALTERNATE PORTFOLIO |
| RETIREMENT INCOME MODEL STRATEGY (RIMS): | 100% | 0% | 13.9% |
| TRADITIONAL ASSET ALLOCATION STRATEGY: | 0% | 100% | 78.4% |
| SIMULATED BOND LADDER STRATEGY: | 0% | 0% | 0% |
| SIMULATED IMMEDIATE LIFETIME ANNUITY STRATEGY: | 0% | 0% | 7.7% |
| TOTAL: | 100% | 100% | 100% |

GENERATE RESULTS

STRATEGY DETAILS

| QUARTER | ALLOCATIONS | | | PROJECTED RETURNS | | | PROJECTED WITH-DRAWALS | PROJECTED END WEALTH |
| --- | --- | --- | --- | --- | --- | --- | --- | --- |
| | % EQUITY | % BOND | % CASH | RETURN FOR EQUITY | RETURN FOR BOND | RETURN FOR CASH | | |
| 0 | | | | | | | | 100.00 |
| 1 | 43% | 55% | 2% | -1.0% | 3.0% | 3.2% | $1.05 | 99.99 |
| 2 | 48% | 50% | 2% | -10.6% | 2.2% | 1.3% | $1.06 | 94.77 |
| 3 | 36% | 62% | 2% | -3.7% | -1.0% | 1.7% | $1.06 | 91.63 |
| 4 | 32% | 66% | 2% | -14.2% | -0.5% | 0.9% | $1.07 | 85.88 |
| 5 | 26% | 72% | 2% | -16.8% | 4.6% | 0.1% | $1.08 | 83.67 |
| 6 | 25% | 73% | 2% | -10.5% | 0.1% | 0.2% | $1.08 | 80.26 |
| 7 | 24% | 74% | 2% | 17.0% | 1.8% | 0.2% | $1.09 | 83.25 |
| 8 | 27% | 71% | 2% | 18.6% | 3.7% | 0.1% | $1.10 | 88.29 |

698

699

[IMPLEMENT STRATEGY]

FIGURE 6D

RETIREMENT PLANNING METHOD

CROSS REFERENCE TO RELATED APPLICATION(S)

This application claims the benefit of U.S. Provisional Application No. 61/724,809, filed on Nov. 9, 2012, which is incorporated herein by reference in its entirety.

BACKGROUND OF THE INVENTION

Field of the Invention

The present invention is directed generally to methods and systems for planning for retirement.

Description of the Related Art

Investors approaching retirement want to know if they will have sufficient financial assets to retire. After all, many investors work for a consistent, predictable paycheck all their lives and hope for the same kind of experience over the duration of their retirement. Whether an investor has sufficient assets to retire will depend on the investor's ability to safely support a proposed retirement spending plan. Many investors turn to advisors who help the investors turn their life savings into paychecks that help support retirement. One question that advisors want to be able to answer quickly and accurately is whether a prospective client has saved enough money.

The wave of baby boomers approaching retirement is spurring the retirement planning industry to find better ways to meet the needs of these investors. This is partly due to the number of boomers and partly because of the nature of the primary investment problem that impacts many of them. Accumulating assets over a long horizon is different from deploying those assets to fund retirement.

All investment decisions require trade-offs. As more investors rely on their portfolios for income, many of those trade-offs are becoming more apparent. A traditional total return approach is grounded in mean variance optimization ("MVO"), which produces asset allocation recommendations that balance risk and reward. These are defined, respectively, as standard deviation and expected (i.e., mean) return. While these measures may be useful for investors growing the assets in their portfolios, they are generally not as useful for investors withdrawing assets from their portfolios to fund retirement expenses.

Therefore, a need exists for methods of planning asset allocations before and during retirement. The present application provides these and other advantages as will be apparent from the following detailed description and accompanying figures.

BRIEF DESCRIPTION OF THE SEVERAL VIEWS OF THE DRAWING(S)

FIG. 2C is an illustration of an exemplary results screen.

FIG. 6D is an illustration of an exemplary strategy details screen, which includes a table listing asset allocations for a first eight periods (e.g., quarters) that may be used to implement a Retirement Income Model Strategy ("RIMS") for an investor's portfolio.

DETAILED DESCRIPTION OF THE INVENTION

Definitions of Terms

Figure 1:
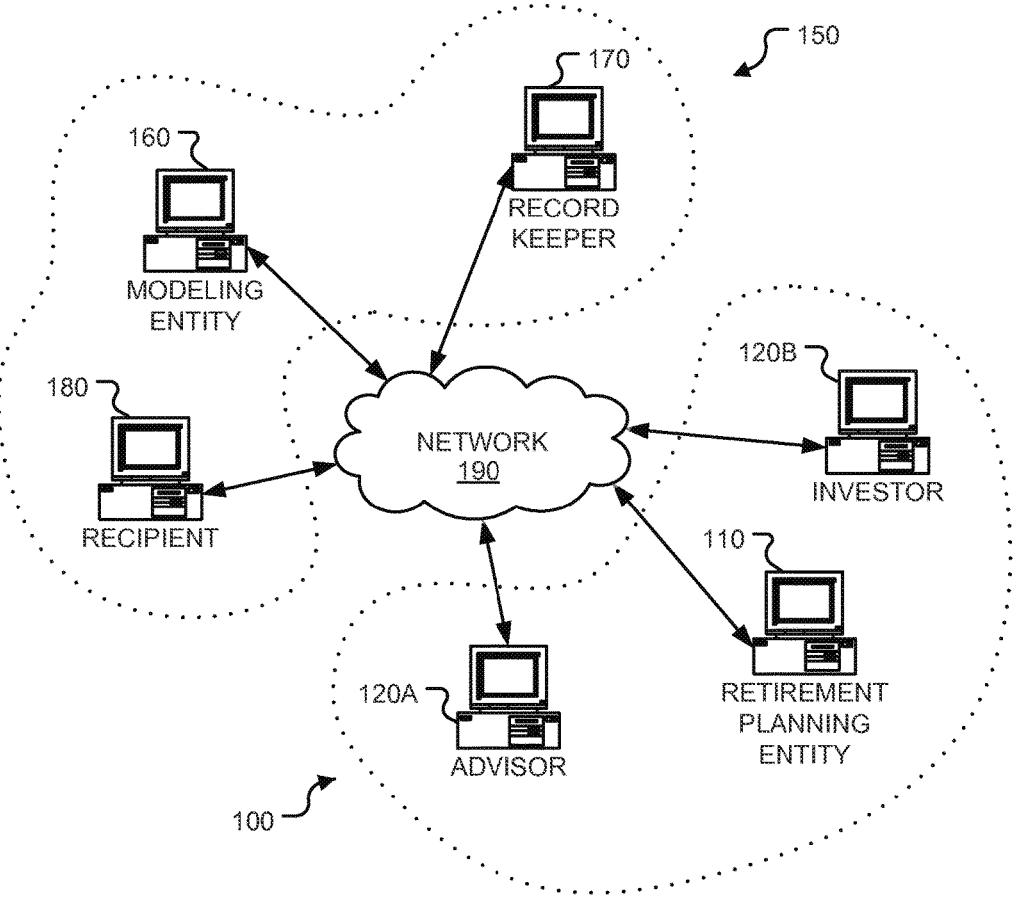
FIG. 1 is a diagram of an exemplary system that may be used to implement a retirement plan methodology and an exemplary system that may be used to implement an adaptive investing methodology.

Unless defined otherwise, technical and financial terms used herein have the same meaning as commonly understood by one of ordinary skill in the art to which this invention belongs. For purposes of the present invention, the following terms are defined below.

Asset Allocation: An apportionment of a fund into one or more asset classes.

Asset: A purchasable tangible or intangible item having economic value. Examples of assets include shares in a mutual fund, shares of a stock, bonds, and the like.

Asset Class: A group of securities that exhibit similar characteristics, behave similarly in the marketplace, and are subject to the same laws and regulations. The three main asset classes are equities (e.g., stocks), fixed-income (e.g., bonds), and cash equivalents (e.g., money market instruments). However, asset classes may include additional types of assets, such as real estate related interests and commodities. Each asset class may reflect different risk, return, or investment characteristics. Further, different asset classes may perform differently in the same market environment.

Capital Preservation Assets: Assets that preserve capital investment. Such assets are typically low risk and frequently provide fixed, often low, returns. Examples of capital preservation assets include fixed income assets (e.g., bonds).

Counterparty Risk: A risk that another party will be unable to meet its obligations. For example, a counterparty risk to a purchaser of a life annuity is that an issuer (e.g., a life insurance company) of the annuity will be unable to pay periodic payments owed under the annuity contract.

Defined Benefit Plan: An employer-sponsored retirement plan that bases employee benefits on a formula that includes factors such as salary history and duration of employment. Investment risk and portfolio management are controlled by the company. There are restrictions on when and how employees can withdraw funds without penalties.

Defined Contribution Pension Plan: A type of retirement plan in which each participant in the plan has an individual account and an employer may contribute an amount to each participant's account periodically (e.g., annually). The account balance is based on employer contributions, participant contributions, participant withdrawals, investment earnings on the money in the account, and expenses.

Funded Ratio: A ratio of assets to liabilities in a defined benefit plan. A funded ratio value greater than one indicates that the assets are able to cover the liabilities. A funded ratio value less than one indicates the assets are either unable to cover the liabilities or are in danger of not being able to do so.

Glide Path: A plot of the percentage of an investment strategy invested in equity assets (as opposed to non-equity assets) over time.

Growth Assets: Assets that provide investment returns (e.g., capital growth and income) that outperform inflation. Examples of growth assets include equities and other high return and high-risk assets.

Investment Fund: A fund invested in one or more securities that is owned by one or more investors. An investment fund is managed as a single entity by one or more managers.

Immediate Life Annuity: An insurance product purchased by an investor for a lump sum that makes periodic payments to the investor during the investor's life. The payments generally terminate upon the investor's death.

Longevity Risk: Risk associated with investors living longer than a predicted (e.g., statistically determined) life expectancy. With respect to an individual investor, longevity risk may be characterized as the risk that the investor will outlive the investor's retirement savings. Annuities and defined-benefit pension plans (defined above) that guarantee lifetime benefits for plan or policy holders are also exposed to longevity risk. Such investments may be required to payout more than expected when annuitants and former employees live longer than the predicted life expectancy.

Managed Account: An investment account that is owned by an individual investor (or account holder) and managed by a professional money manager. The manager generally determines how the account assets are allocated. Thus, managed accounts may be characterized as personalized investment portfolios tailored to the specific needs of the account holder. Because of account management costs, managed accounts are often held by high net worth investors.

Net Asset Value ("NAV"): The cost per unit or share of a mutual fund or Exchange Traded Fund ("ETF"). The NAV is calculated by subtracting liabilities from the value of all fund securities and assets and then dividing the result by the number of fund shares outstanding.

Real Interest Rate: The rate of interest after subtracting inflation.

Record keeper: An entity that performs a record keeping function with respect to an investment account. The record keeping function includes accounting and database maintenance. The record keeper typically maintains a database of account information and processes transactions, such as contributions, transactions, and withdrawals.

Synthetic NAV: A NAV designed to closely track another NAV without holding the same assets as the tracked NAV.

Target Date Fund (also known as a Life Cycle Fund, an Age-Based Fund, and a Lifestyle Fund): A "managed" diversified investment fund that over time adjusts the portions of the assets in the fund belonging to a plurality of asset classes (e.g., stocks, bonds, cash equivalents, etc.) according to a target date fund investment strategy (which includes a glide path that is typically predetermined). A first portion of the target date fund investment strategy occurs during an accumulation phase and a second portion of the target date fund investment strategy occurs during a decumulation phase. By adjusting the portion of the assets in the fund belonging to each of the plurality of asset classes, the target data fund attempts to manage wealth generated by the fund at the end of the accumulation phase on a "target date." Generally, a target date fund shifts the portion of the assets in the fund belonging to each of the plurality of asset classes towards a more conservative mix (e.g., a higher proportion of fixed income assets and a lower proportion of equity assets) as the fund approaches the target date. The managers of these funds decide issues related to asset allocation, diversification, and rebalancing over the accumulation and decumulation phases of the target date fund's investment strategy. Target date funds are described in detail in U.S. Patent Publication No. 2009/0048958, titled "Method of Evaluating the Performance of a Family of Target Date Funds," which is incorporated herein by reference in its entirety.

Zero-Coupon Bond (also called a discount bond or deep discount bond): A bond having a purchase price, a par (or face) value greater than the purchase price, and a maturity date. The bond is bought at the purchase price, and the face value is paid to the purchaser at the maturity date. A zero coupon bond does not make periodic interest payments.

Examples of zero-coupon bonds include U.S. Treasury bills, U.S. savings bonds, long-term zero-coupon bonds, and any type of coupon bond from which the coupons have been clipped or otherwise removed.

Overview

A retirement plan includes an asset plan and a liability (or spending) plan. The asset plan includes any sources of income (e.g., savings, investments, businesses, Social Security, etc.) that may be used to fund the liability plan. The liability plan should include any essential future expenses required for the investor to live (or subsist). However, many investors hope to have a lifestyle during retirement that is better than mere subsistence.

As mentioned in the Background Section above, investors are concerned about whether their asset plans are sufficient to support their essential retirement spending needs, and they hope their asset plans will be sufficient to support a desired level of retirement spending (beyond merely covering essential expenses).

However, conventional methods of making this determination are complicated and often produce unreliable results. For example, many advisors use market-return forecasts provided by retirement planning tools to determine asset plan spending feasibility. One weakness of this approach is that the assessment is dependent on forecasts rather than known values. Thus, if the market-return forecasts are based on an overly optimistic equity return assumption, the investor's plan will be at greater risk of failure than indicated by the retirement planning tool. Similarly, if the market-return forecasts are based on an overly pessimistic equity return assumption, the investor's plan will be better funded than indicated by the retirement planning tool. In either situation, the investor may make decisions based on the market-return forecasts that are inappropriate for the investor's situation.

As defined above, a funded ratio is a ratio of assets to liabilities in a defined benefit plan. Funded ratios are used to compare liabilities (future payments to be paid to plan participants) to assets (an amount of wealth the fund holds to generate those payments). A funded ratio value greater than one is desirable because it indicates that the assets fully cover the liabilities. On the other hand, a funded ratio value less than one indicates the assets are either unable to cover the liabilities or are in danger of being unable to do so.

While funded ratio has been used historically to evaluate defined benefit plans, funded ratio has not been used with respect to planning retirement income (and asset needs) with respect to an individual. One reason for this is that defined benefit plans are treated as if they continue into perpetuity. In other words, while over time new members join and existing members leave, the defined benefit plan itself continues. Defined benefit plans benefit from pooling mortality risk and ongoing contributions, and are backstopped by the Pension Benefit Guaranty Corporation ("PBGC"), a U.S. Government agency. On the other hand, an individual's retirement is of an indeterminable duration (unknown mortality), contributions will likely stop at some point (often at the start of retirement), and the individual may not be backstopped by any other entities. Therefore, it was traditionally believed that a funded ratio calculation had no applicability to an individual investor.

Based on research, the inventors have determined that (contrary to conventional thinking) funded ratio may be used to evaluate a particular individual investor's asset plan to determine whether the investor has adequate assets to fund a proposed liability plan (referred to as a "proposed retirement spending plan"). In particular, multiple retirement spending plans may be evaluated and their funded ratios compared to one another. Further, funded ratio may be used to evaluate the adequacy of wealth generated by different investment strategies with respect to one or more proposed retirement spending plans. Generally speaking, adequately funded proposed retirement spending plans have funded ratios greater than one, meaning the investor has more assets than liabilities. Conversely, inadequately funded proposed retirement spending plans have funded ratios less than one, meaning the investor has more liabilities than assets. A funded ratio equal to one (or within a predetermined range of one), indicates that the investor is at some risk that the investor's retirement plan is inadequately funded.

Figures 2A, 2B:
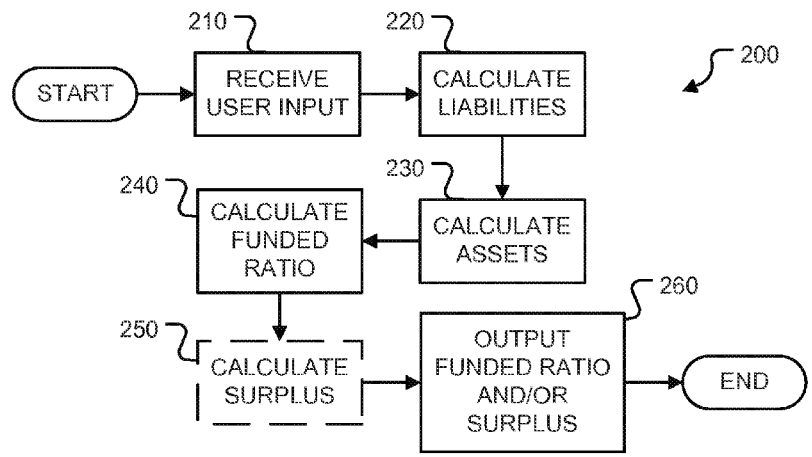
FIG. 2A is a flow diagram of a method of evaluating a funded ratio for a particular investor.
FIG. 2B is an illustration of an exemplary user input screen.

FIG. 2A is a flow diagram of a method 200 of evaluating a funded ratio for a particular investor. The investor has an asset plan including one or more assets, and one or more proposed retirement spending plans. The method 200 is performable by one or more computing devices (e.g., a computing device 110 illustrated in FIG. 1). The method 200 may be repeated for each of a plurality of investors. Further, the method 200 may be performed for two or more investors combined (e.g., for a married coupled). The method 200 may be performed by an advisor using information provided to the advisor by one or more investors. While not a requirement, it may be desirable to perform the method 200 after the investor has retired or will be retiring soon. The method 200 may be repeated for an investor (or investors) occasionally (e.g., periodically). By way of a non-limiting example, it may be beneficial to perform the method 200 every year.

For ease of illustration, the method 200 will be described as being performed by the computing device 110 (see FIG. 1) with respect to a married couple, Jack and Judy Holmes. Jack is 61-years-old and will retire in six months. Judy is 62-years-old and retired one year ago but has been living off Jack's income (i.e., they have not received a disbursement from their retirement savings). Neither has a pension, but together they have saved $760,000. Jack plans to add another $15,000 to his retirement account during his final six months of work. They are depending on their nest egg and a combined $38,000 per year social security benefit to support their retirement. They have two proposed retirement spending plans. The first plan (referred to as an "essential spending plan") budgets $60,000 per year to support their essential living needs. However, the essential spending plan will require that they make some cutbacks to their current lifestyle. Like most couples, they hope to enjoy a comfortable retirement. The second plan (referred to as a "lifestyle spending plan") budgets $72,000 per year. This plan budgets for some travel and other activities in which they would like to participate. However, the Holmes are unsure whether the lifestyle spending plan is adequately funded by their retirement assets.

If the Holmes implement the essential spending plan, they will need to withdraw $22,000 ($60,000−$38,000=$22,000) per year from their retirement portfolio. If instead they implement the lifestyle spending plan, they will need to withdraw $34,000 ($72,000−$38,000=$34,000) per year from their retirement portfolio. It is important to note that both of these withdrawal rates (2.8% and 4.4%) seem reasonable considering the "4% Rule." The 4% Rule is a commonly referred to rule of thumb proposed by William Bengen in an article published in 1994 in the *Journal of Financial Planning*. In this article, Bengen showed how a retiree could safely withdraw 4% of a balanced portfolio each year, adjusted for inflation, and still have enough money in the portfolio to continue such withdrawals for at least 30 years. However, Jack and Judy are young retirees. They likely have long lives ahead of them, which is a fact that needs to be considered. Using the method 200 (which factors in longevity), their spending plans can be readily assessed.

The method 200 may be performed with respect to the Holmes, their advisor, and the like. For ease of illustration, the method 200 will be described as being performed with respect to a user.

In first block 210, the computing device 110 receives user input from the user. By way of a non-limiting example, the user input may be entered into a user input screen 270 illustrated in FIG. 2B. The user input screen 270 may include a "SUBMIT" button (or similar user input component) that may be used to indicate the user has finished entering user input and would like to proceed with the method 200. The user input may include marital status (e.g., married), ages (e.g., 61-years-old and 62-years-old), an amount of time until a first retirement disbursement from retirement savings (e.g., six months), amount of retirement savings (e.g., $760,000), annual pre-retirement income (e.g., $100,000), percentage of working income contributed to retirement savings (e.g., 30%), amount of social security income (e.g., $38,000), and proposed annual spending amount (e.g., $60,000 or $72,000).

Optionally, the user may input one or more advisor fees, a combined income tax rate, a capital gain tax rate, and an indication as to how much of the retirement savings is taxable (and at what rate), non-taxable, and/or tax deferred. These values may be used to adjust (e.g., increase) the proposed annual spending amount to account for taxes. Optionally, the user may input a cost of living adjustment amount (e.g., 2.5%) for the proposed annual spending amount (e.g., to be used as a value of the variable "$i_t$" in Equation 1, described below). Optionally, the user may input a cost of living adjustment amount (e.g., 1.5%) for one or more post-retirement sources of income (e.g., social security, pension, annuities, rental income, and the like).

Returning to FIG. 2A, in block 220, the computing device 110 calculates a net present value of the Holmes' retirement liabilities for one or more proposed retirement spending plans. This value may be stored in a variable "L." How this value is calculated is described in detail below with respect to an Equation 1 and a method 300. For ease of illustration, in block 220, the computing device 110 determines the value of the variable "L" is $510,591 for the essential spending plan, and $789,095 for the lifestyle spending plan.

Next, in block 230, the computing device 110 calculates a net present value of the Holmes' retirement assets (e.g., a sum of a present value of current assets, and a present value of any future income such as income from Social Security, pensions, annuities, and the like). This value may be stored in a variable "A." How this value is calculated is described in detail below with respect to Equations 2 and 3, and a method 400.

By way of a non-limiting example, the present value of retirement assets may have two components. The first component is referred to as a net present value of financial assets. The value of this component may be stored in a variable "V." How this value is calculated is described in detail below with respect to an Equation 2. For ease of illustration, in block 230, the computing device 110 determines the value of the variable "V" to be $760,000.

The second component is referred to as a net present value of human capital. The value of this component may be stored in a variable "H." How this value is calculated is described in detail below with respect to an Equation 3. For ease of illustration, in block 230, the computing device 110 determines the value of the variable "H" is $15,000.

The net present value of the Holmes' retirement assets may be calculated as a sum of the values of the variables "V" and "H," which in this example is $775,000.

In block 240, the computing device 110 calculates a funded ratio for each of the proposed retirement spending plans. This value may be stored in a variable "FR." As explained above, a funded ratio is the net present value of the assets (e.g., the value of the variable "A") divided by the net present value of the liabilities (e.g., the value of the variable "L"). An Equation 4 (below) provides a mathematical formula for calculating a funded ratio. For ease of illustration, the funded ratio for the essential spending plan is 1.52 (($15,000+$760,000)/($510,591)≈1.52) and the funded ratio for the lifestyle spending plan is 0.98 (($15,000+$760,000)/($789,095)≈0.98). Thus, the essential spending plan is adequately funded because it has a funded ratio greater than one, and the lifestyle spending plan is not adequately funded because it has a funded ratio less than one. However, the lifestyle spending plan appears to be only slightly underfunded because its funded ratio is very close to one.

In optional block 250, the computing device 110 calculates a surplus value for each of the proposed retirement spending plans. This value may be stored in a variable "S." An Equation 5 (below) provides a mathematical formula for calculating the surplus value. For ease of illustration, the surplus value for the essential spending plan is $264,400 ($15,000+$760,000−$510,591=$264,400) and the surplus value for the lifestyle spending plan is −$14,100 ($15,000+$760,000−$789,095=−$14,100). Thus, the adequately funded essential spending plan has a surplus value greater than zero, and the underfunded lifestyle spending plan has a surplus value less than zero.

In block 260, the computing device 110 outputs (e.g., display and/or prints) the funded ratio and/or the surplus value for each of the proposed retirement spending plans. By way of a non-limiting example, this output may be displayed in a results screen 280 illustrated in FIG. 2C. As will be explained below with respect to a method 500, these values may be used to adjust the investor's asset plan and/or liability plan as appropriate.

Then, the method 200 terminates.

The method 200 may be configured to provide benefits over traditional retirement savings evaluation methods (e.g., mean variance optimization). For example, the method 200 may provide an evaluation of the adequacy of an investor's asset plan to fund the investor's proposed retirement spending plan that addresses the uncertainty of the investor's longevity. Further, the method 200 does not depend on forecasts of market returns or information about a particular investment plan to determine the adequacy of the investor's asset plan with respect to funding the investor's proposed retirement spending plan. As discussed above, one weakness of traditional approaches to retirement planning is that they rely on market-return projections to determine the adequacy of an investor's asset plan to fund the investor's proposed retirement spending plan.

The funded ratio provides an objective measure of the adequacy of a proposed retirement spending plan relative to a particular individual's asset plan that accounts for both inflation and longevity. To help illustrate the benefits of using funded ratio, two hypothetical investors will be described. Each of these investors plans to withdraw $50,000 a year, adjusted annually for cost of living. The first investor is a 65-year-old woman with a portfolio value of $1.25 million. The second investor is an 80-year-old man with a portfolio value of $575,000. Thus, the annual withdrawal rate is 4% for the younger first investor, and 9% for the older second investor.

On the surface, it might seem like the older second investor is taxing his portfolio more because the withdrawal rate is more than twice that of the younger first investor. However, because the older second investor has a shorter life expectancy due to his advanced age, the second investor will most likely not need to sustain that level of spending for nearly as long as the younger first investor must sustain her lower spending level. This means the older second investor's liabilities are considerably smaller than those of the younger first investor.

The younger first investor has a liability of approximately $1,090,317 (the actuarial net present value of $50,000 increased 3% each year for cost of living). Thus, the funded ratio of the younger, first investor is about 1.14 ($1,250,000/$1,090,317=1.14).

The older second investor has a liability of approximately $511,981 (the actuarial net present value of $50,000 increased 3% each year for cost of living). Thus, the funded ratio of the older second investor is about 1.12 ($575,000/$511,981=1.12).

This example shows that quite different age and withdrawal rate combinations can have remarkably similar funded ratios, representing similar capacities for risk.

Exemplary Yield Curves

Tables 1 and 2 below each provide examples of yield curves that may be used to calculate the funded ratio and surplus value for each proposed retirement spending plan.

Table 1 (below) provides an example of a U.S. Treasury yield curve.

TABLE 1

| | Duration (Years) | | | | | | | | | |
|---|---|---|---|---|---|---|---|---|---|---|
| | 1 | 2 | 3 | 4 | 5 | 10 | 12 | 15 | 20 | 30 | 50 |
| Yield | 0.31% | 0.64% | 1.09% | 1.56% | 2.00% | 3.61% | 4.04% | 4.33% | 4.61% | 4.75% | 4.81% |

Table 2 (below) provides an example of an AA Investment Grade Yield Curve.

TABLE 2

| | Duration (Years) | | | | | | | | | |
|---|---|---|---|---|---|---|---|---|---|---|
| | 1 | 2 | 3 | 4 | 5 | 10 | 12 | 15 | 20 | 30 | 50 |
| Yield | 0.75% | 1.23% | 1.80% | 2.35% | 2.86% | 4.61% | 5.00% | 5.35% | 5.62% | 5.71% | 5.69% |

Assessing Retirement Liabilities

Retirement liabilities are future payments required to support retirement living expenses and other retirement expenditures. As mentioned above, the total present value of retirement liabilities may be represented by the variable "L" (which may be calculated using the Equation 1 below). Generally speaking, the primary liability of a retired investor is the income stream that replaces the paycheck the investor received from the investor's employer.

One way to determine the net present value of future liabilities is to use market prices. Insurance companies enter into annuity contracts with individuals. These annuity contracts provide a market in which individuals may exchange a lump sum payment for a stream (or series) of future payments. The payments continue over an investor's lifetime. Prices for annuity contracts are readily available. However, there are some subtle issues (or problems) with using market prices of annuity contracts to value liabilities. For example, annuity contracts that cover an investor's liabilities fully may not be available (e.g., not offered by an insurance company). Further, it may be difficult to find an insurance company that will guarantee future payments linked to inflation. Insurance companies often provide step-ups, where future payments increase at a fixed rate, but this does not hedge the risk of inflation growing faster than the step-up rate. Additionally, buying an insurance contract subjects the purchaser to counterparty risk. In other words, if the insurance company goes out of business, it may default on the annuity contract.

An alternative to using market prices (e.g., prices for annuity contracts) to determine the net present value of future liabilities is to use a pricing methodology similar to that used by insurance companies to price insurance contracts. Insurance companies employ actuaries to price insurance contracts. Actuaries have defined methods for pricing liabilities that can be replicated, and amended to address investor-specific liabilities. Counterparty risk can also be considered in the valuation by making an assumption that the portfolio backing the annuity payments is invested in U.S. treasury bonds that hedge the liability of the investor. Because treasury bonds are backed by the full faith and credit of the U.S. Government, the risk of investing in U.S. treasury bonds is very low.

The actuarial net present value of a stream of future payments can be calculated by the Equation 1 below.

$$L = \sum_{t=R}^{t=\infty} \frac{(1+i_t)^{t-1} D_t p_t}{(1+r_t)^{t-1}} \quad \text{Equation 1}$$

The value of the variable "R" in the Equation 1 is a number of periods until a future retirement distribution is made to support retirement spending. For someone already retired, the variable "R" may be set equal to one. The value of the variable "t" is a period number (e.g., ranging from the value of the variable "R" to infinity). By way of a non-limiting example, a period may be one year in length. While the Equation 1 indicates the summation is performed for an infinite number of periods, a mortality table (e.g., U.S. Annuitant 2000 Table prepared by the Society of Actuaries) may be used to determine a maximum number of periods (which correspond to a maximum age value in the mortality table). A mortality table includes a probability (or likelihood) an individual will live to a particular age. As the age values increase, this probability approaches zero. The maximum age value corresponds to the smallest age value at which this probability is zero (or within a predefined value of zero).

The value of the variable "$D_t$" is an amount of the distribution paid at the beginning of the period t expressed in present value (e.g., today's dollars).

The value of the variable "$r_t$" is a yield of a zero coupon bond (e.g., a zero coupon U.S. Treasury Bond) maturing in period t. Thus, in implementations in which a period is one year in duration, the maturity date of the zero coupon bond may be in t years. The values of the variable "$r_t$" are obtained from a yield curve. An example of a suitable yield curve is provided above in Table 1.

The value of the variable "$p_t$" is a probability that a liability in period t will have to be paid. These values are obtained from the mortality table. For a single person, the variable "$p_t$" is the probability that the person is alive in period t. For a couple, the variable "$p_t$" is the probability that at least one of the two people is alive in period t. To keep the formula simple, it may be assumed that the benefit to a survivor is 100%. The formula may be altered to account for other survivor benefits, such as 75%.

The value of the variable "$i_t$" is an expected annualized inflation rate from the beginning of the present period to the beginning of period t. By way of a non-limiting example, the value of the variable "$i_t$" may be a constant (e.g., 2.5%). The value of the variable "$i_t$" may be obtained from a user. Alternatively, the value of the variable "$i_t$" may be obtained from an inflation forecast.

Figure 3A:
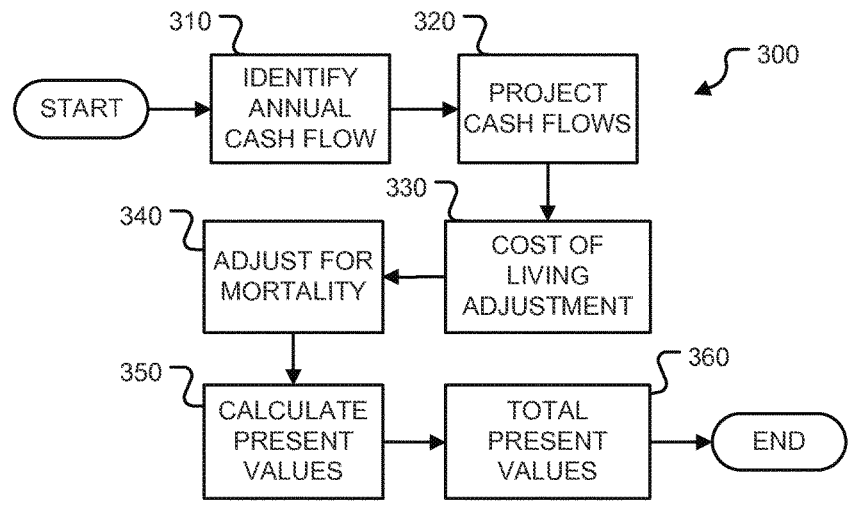
FIG. 3A is a flow diagram of a method of determining an actuarial net present value of an investor's liabilities.

FIG. 3A is a flow diagram of the method 300 of determining the actuarial net present value of an investor's liabilities. The method 300 may be characterized as a step-by-step explanation of the Equation 1. The method 300 may be performed in block 220 of the method 200. For ease of illustration, the method 300 will be described as being performed by the computing device 110. Also, for ease of illustration, the method 300 is described as being performed with respect to an investor who is 65-years-old, retired, and has a proposed retirement spending plan that budgets $50,000 per year to cover retirement spending.

In first block 310, the computing device 110 identifies the investor's annual real cash flows (liabilities). In this example, the annual cash flows (liabilities) total $50,000.

Figure 3B:
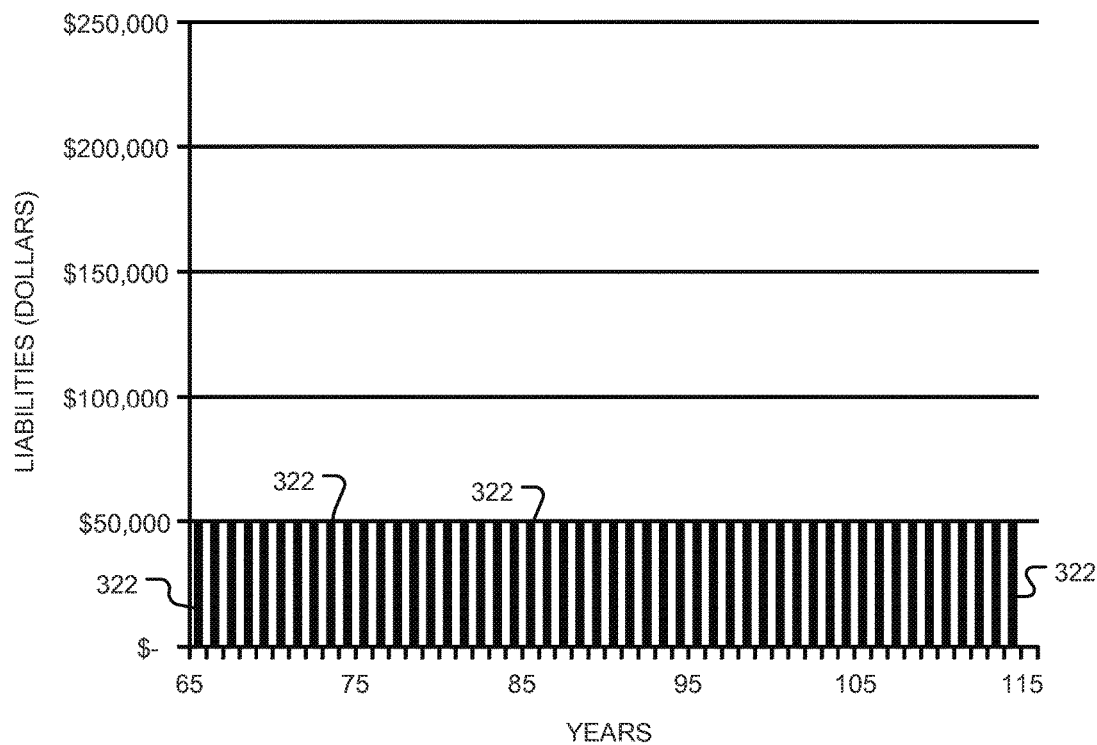
FIG. 3B is a bar graph illustrating projections of annual cash flows through each year in a mortality table up to a maximum age value.

Next, in block 320, the computing device 110 projects the annual cash flows identified in block 310 through each year in the mortality table up to the maximum age value. FIG. 3B is a bar graph illustrating such projections through 114 years (the maximum age value in the mortality table). In the bar graph, each solid black bar 322 illustrates a uniform annual cash flow of $50,000 for one year. As mentioned above, each cash flow occurs at the start of a period. Thus, the bar graph shows total cash flows for the investor from age 65 through age 114 (the maximum age value in the mortality table). In the Equation 1, the cash flow is represented by the variable "$D_t$" discussed above.

Figure 3C:
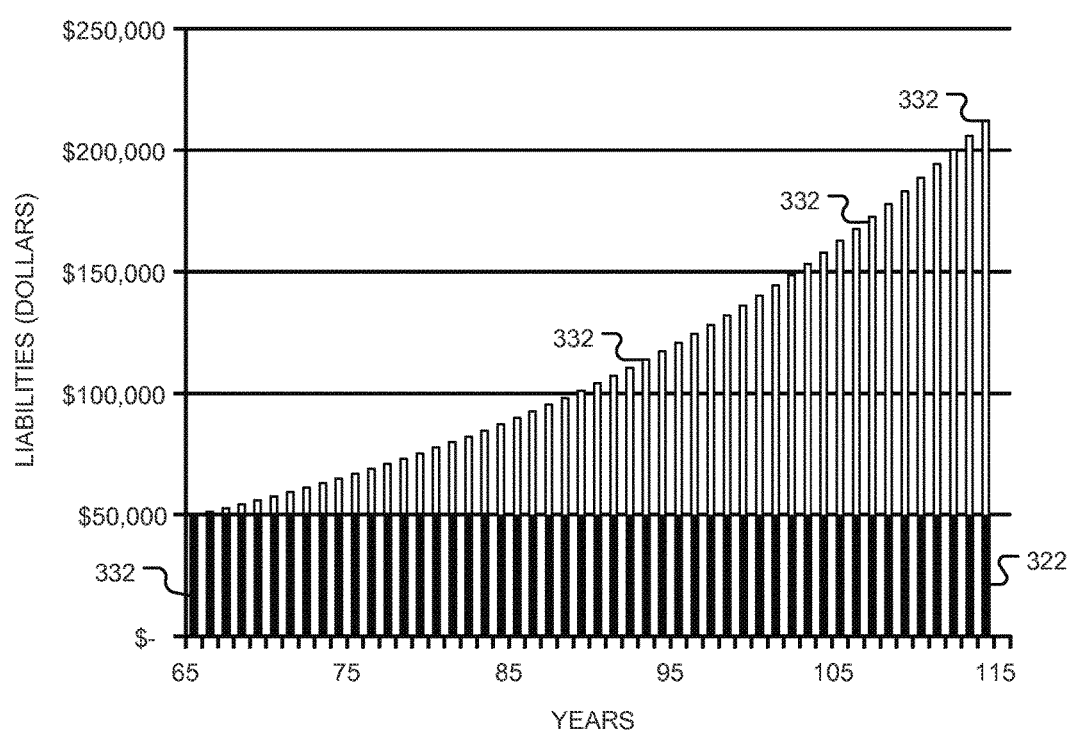
FIG. 3C is a bar graph illustrating an exemplary cost of living adjustment made to the cash flows of FIG. 3B.

In block 330, the computing device 110 performs a cost of living adjustment. FIG. 3C is a bar graph illustrating an exemplary cost of living adjustment made to the cash flows of FIG. 3B. In the bar graph, each white bar 332 outlined in black illustrates a cost of living adjustment made to the cash flow of $50,000 for one year. In the Equation 1, this adjustment is effected by the variable "$i_t$" discussed above.

Figure 3D:
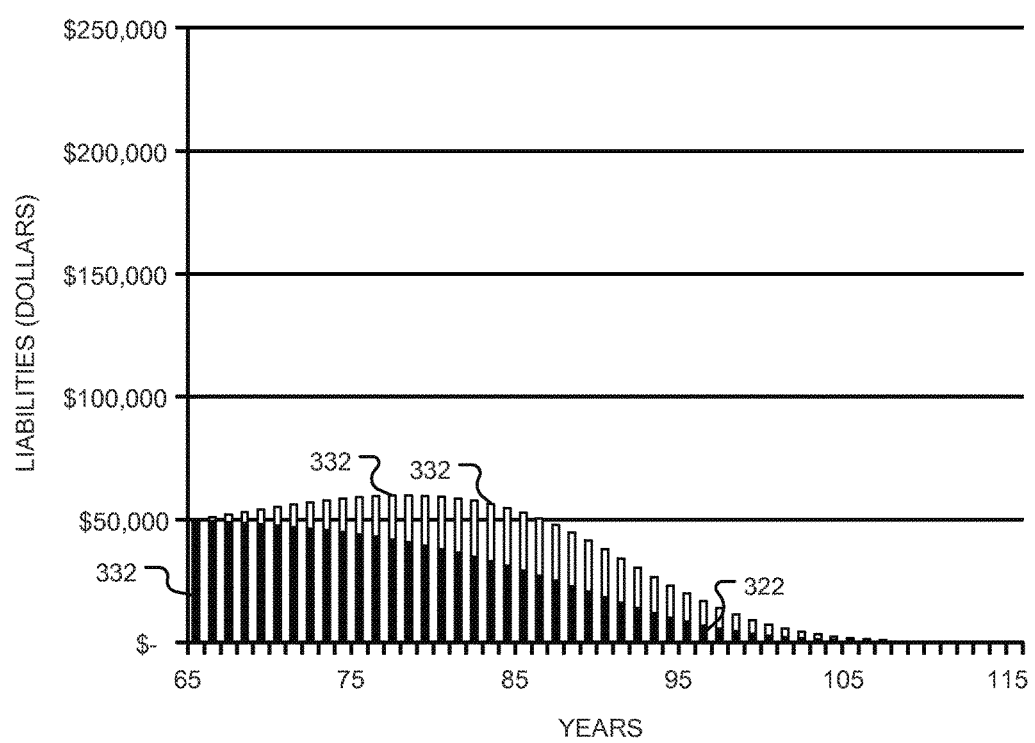
FIG. 3D is a bar graph illustrating an exemplary mortality adjustment made to the cost of living adjusted cash flows of FIG. 3C.

In block 340, the computing device 110 adjusts the cost of living adjusted cash flows based on likelihood of mortality within each period. FIG. 3D is a bar graph illustrating an exemplary mortality adjustment made to the cost of living adjusted cash flows of FIG. 3C. As shown in FIG. 3D, the liabilities closer to 114 years of age are reduced to zero (or nearly zero). In the Equation 1, this adjustment is effected by the variable "$p_t$" discussed above.

Figure 3E:
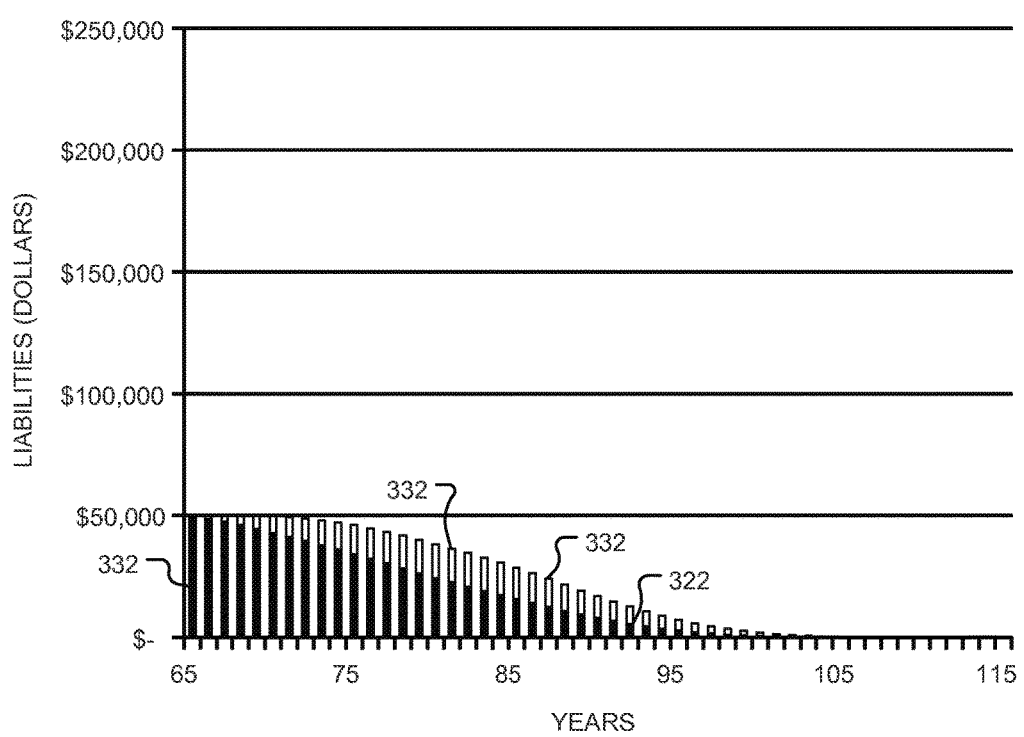
FIG. 3E is a bar graph illustrating the present values of the mortality (and cost of living) adjusted cash flows of FIG. 3D.

In block 350, the computing device 110 calculates the present value of the mortality (and cost of living) adjusted cash flows for each year. FIG. 3E is a bar graph illustrating the present values of the mortality (and cost of living) adjusted cash flows of FIG. 3D. In the Equation 1, the present value is calculated using the yield of a zero coupon treasury (obtained from a yield curve) stored in the variable "$r_t$."

Figure 3F:
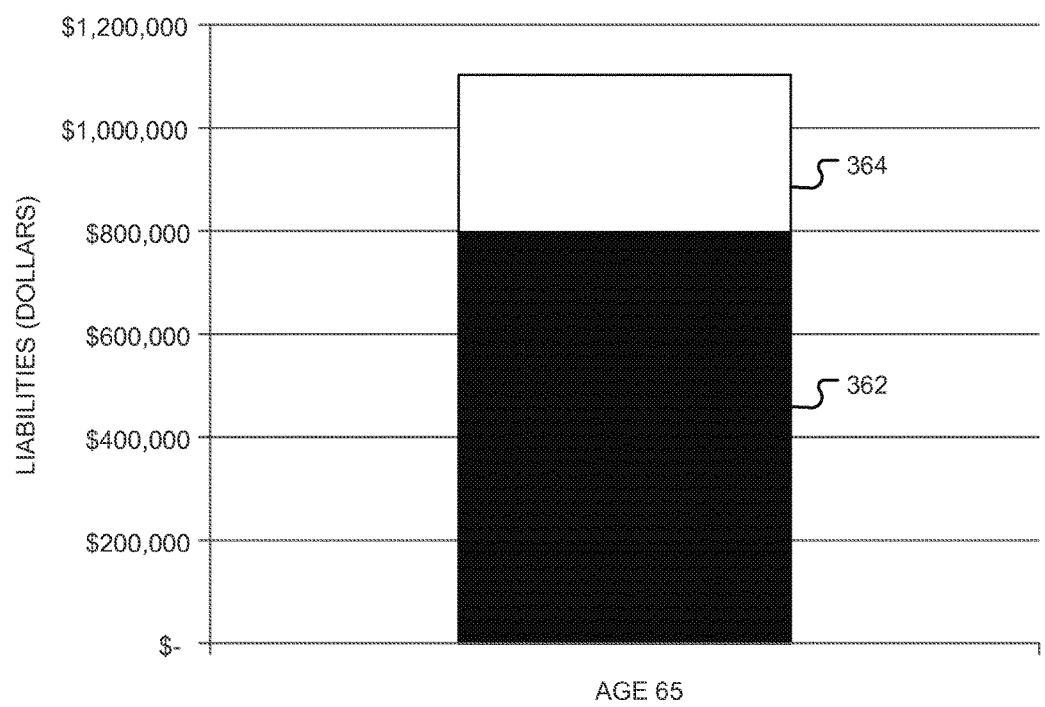
FIG. 3F is a bar graph illustrating the actuarial present value.

In block 360, the computing device 110 sums the present values calculated for each year to obtain the actuarial net present value. This is accomplished by the summation in the Equation 1. While the Equation 1 sums over infinity, the mortality table reduces values beyond 114 years to zero. Therefore, in this example, the summation need only sum from the value of the variable "R" to the maximum age value in the mortality table. FIG. 3F is a bar graph illustrating the actuarial present value. The solid black portion 362 is the portion of the actuarial present value contributed by the cash flows and the white portion 364 is the portion of the actuarial present value contributed by cost of living increases.

An insurance company can ameliorate longevity risk by selling contracts to a pool of investors that will have an aggregate life expectancy close to an average (statistically determined) life expectancy. However, it is generally believed to be a mistake to plan only to the average life expectancy for a particular investor because the investor may live past the average life expectancy. Thus, the method 300 does not evaluate liabilities based on an average outcome (e.g., a statistically determined life expectancy).

While an individual cannot diversify mortality risk, unlike an insurance company, which can pool investors, an individual can preserve the option to purchase insurance. It has been shown that if an individual maintains sufficient wealth to purchase an annuity (e.g., a life annuity), the investor maintains the option to cover the investor's liabilities using an annuity contract. Fullmer R. K., *A Framework for Portfolio Decumulation*, Journal of Investment Consulting, vol. 10, no. 1 (2009), incorporated herein in its entirety. This means that retirees who decide not to insure should maintain a funded ratio greater than one. If the investor does so, the investor will have the ability to cover essential spending needs for the rest of the investor's life if (a) an insurance company is willing to sell an annuity to the investor, and (b) the investor has sufficient assets to purchase the annuity contract (which is true when the investor has a funded ratio of greater than one). However, if an annuity is actually purchased, the investor is exposed to counterparty risk, which will need to be considered.

Assessing Assets

Figure 4:
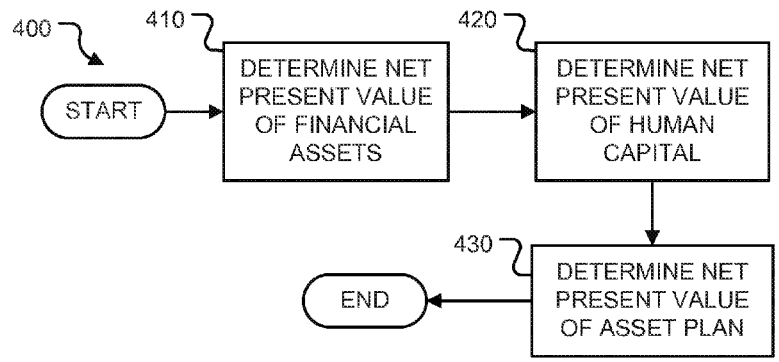
FIG. 4 is flow diagram of a method of determining a net present value of an investor's asset plan.

FIG. 4 is flow diagram of the method 400 of determining the net present value of an investor's asset plan. The net present value of an investor's asset plan is represented by the variable "A." The method 400 may be performed in block 230 of the method 200. For ease of illustration, the method 400 will be described as being performed by the computing device 110.

The net present value of the investor's asset plan is the sum of the present values of each asset owned by the investor that can be used to offset the liabilities (in the investor's liability plan) determined above by the method 300 (and the Equation 1). For most investors, these assets include financial assets and human capital. However, other assets such as inheritance, contingent claims, and the like may also be included. For ease of illustration, in this example, the method 400 considers only financial assets and human capital.

In first block 410, the computing device 110 determines the net present value of the investor's financial assets. The net present value of the investor's financial assets is simply the sum of the present value of each of the financial assets currently owned by the investor. By way of non-limiting examples, the net present value of the investor's financial assets may include the present value of each of the investor's financial accounts, the value of any equity that would be obtained from the sale of any businesses owned by the investor, the value of any equity in properties owned by the investor, and/or the present value of any other assets that contribute to the net worth of the investor. The net present value of the investor's financial assets is represented by the variable "V" and may be calculated using the Equation 2 below.

$$V = \Sigma_{i=1}^{N} V_i \qquad \text{Equation 2}$$

In the Equation 2, the investor's financial assets are numbered sequentially from one to a total number of financial assets owned by the investor. In the Equation 2, the variable "N" stores a total number of financial assets owned by the investor, the variable "i" stores the asset number identifying a particular asset, and the variable "$V_i$" stores the value of any equity in the financial asset corresponding to asset number i. To keep the formula simple, the Equation 2 assumes that the survivor benefit to the investor is 100%. The Equation 2 may be altered to account for other survivor benefit levels (e.g., 25%, 50%, 75%, etc.).

Next in block 420, the computing device 110 determines the net present value of the investor's future human capital that will be contributed to retirement savings. Thus, the net present value of the investor's future human capital is the net present value of future retirement savings. Future human capital includes any future income (e.g., salary) that will be earned by the investor. When an investor has retired (and is not generating income from working), the value of the net present value of the investor's future human capital may be set equal to zero.

The net present value of the investor's future human capital may be calculated as the sum of future retirement contributions discounted at an appropriate interest rate. A thorough discussion of how to value human capital is provided in Ibbotson et al., *Lifetime Financial Advice: Human Capital, Asset Allocation and Insurance*, The Research Foundation of the CFA Institute (2007), which is incorporated herein in its entirety. Any of the methods described in this publication may be used in block 420.

By way of a non-limiting example, an AA investment grade yield curve may be used to obtain discount rates because future savings contributions may be similar to risk associated with AA bond coupon payments. Examples of these yield rates are provided in Table 2 above. However, this assumption may be inappropriate for some occupations (such as stock trader), with future contributions that are more equity-like. The yield curve used to discount future payments may be risk-adjusted to match the risk of human capital payments.

As mentioned above, the total present value of the human capital is represented by the variable "H" and may be calculated using the Equation 3 below.

$$H = \sum_{t=1}^{t=R-1} \frac{\alpha_t S_t}{(1+\bar{r}_t)^{t-1}} \qquad \text{Equation 3}$$

In the Equation 3, the value of the variable "R" is a number of periods until a future retirement distribution is made (which is one period after retirement contributions cease). For someone already retired, the value of the variable "R" may be set equal to one. The value of the variable "t" is a period number (e.g., one to the value of the variable "R" minus one). By way of a non-limiting example, a period may be one year in length.

In Equation 3, the variable "$S_t$" stores the projected salary in period t. The variable "$\alpha_t$" stores a savings rate (e.g., a percentage of projected salary) in period t. Thus, the product of the variables "$S_t$" and "$\alpha_t$" represents an amount of a future retirement contribution. The variable "$\bar{r}_t$" stores the interest rate on the yield curve for a future retirement contribution made in t periods from now. As explained above, the value of the variable "$\bar{r}_t$" may be obtained from a yield curve (such as the one provided in Table 2). In this example, future (human capital) retirement contributions are deposited at the beginning of each period.

While the Equation 3 does not factor mortality risk into the calculation of human capital, this is not a requirement and other approaches that consider mortality risk are within the scope of the present teachings.

If an investor forecasts an unusually high savings plan that the investor is unlikely to meet, the value of his human capital will be overstated. This may defeat the purpose of using funded ratio to assess adequacy, because the projected value of the assets will be overstated. This problem is similar to basing a retirement plan on overly optimistic future market returns. Therefore, it is desirable for an investor to forecast an achievable future savings plan identifying one or more future retirement contributions that the investor is likely to make.

In block 430, the computing device 110 determines the net present value of the investor's asset plan. The net present value of the investor's asset plan is the sum of the variables "V" and "H" (i.e., A=V+H).

Then, the method 400 terminates.

Calculating Funded Ratio and Surplus

As stated above with respect to block 240 of the method 200 illustrated in FIG. 2A, funded ratio is the ratio of assets to liabilities and may be calculated using the Equation 4 below:

$$FR = \frac{A}{L} = \frac{V+H}{L} \qquad \text{Equation 4}$$

If the net present value of the investor's assets (numerator) is greater than the net present value of the investor's liabilities (denominator), the investor's retirement plan is fully funded (or feasible). On the other hand, if the funded ratio is less than one (i.e., the denominator is larger than the numerator), the plan is underfunded (or infeasible).

As stated above with respect to block 250 of the method 200 illustrated in FIG. 2A, a surplus value is the difference between an investor's assets and liabilities. The surplus value may be calculated using the Equation 5 below:

$$S=(A-L)=(V+H-L) \qquad \text{Equation 5}$$

An investor having a surplus value greater than zero has a funded ratio that is greater than one, indicating a fully funded (or feasible) retirement plan. On the other hand, an investor having a negative surplus value has a funded ratio that is less than one and an underfunded (or infeasible) retirement plan.

Managing Funded Ratio

Figure 5:
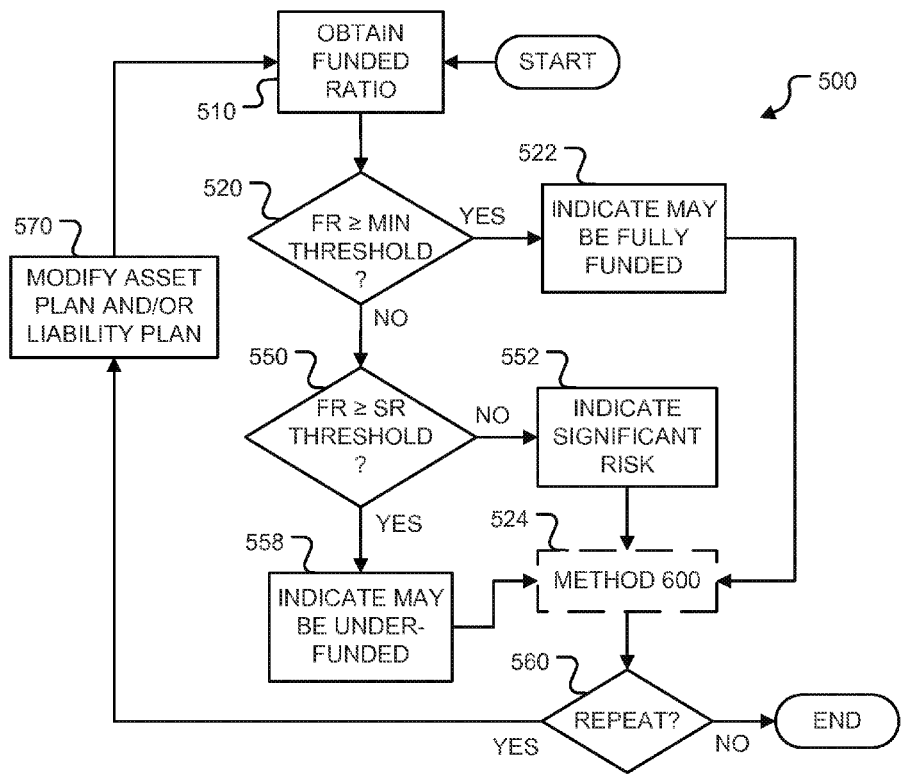
FIG. 5 is a flow diagram of a method of managing an investor's funded ratio.

While funded ratio provides an indication of the viability or feasibility of an investor's retirement plan, funded ratio must be managed. FIG. 5 is a flow diagram of the method 500 of managing an investor's funded ratio. The method 500 is performable by one or more computing devices (e.g., a computing device 110). The method 500 may be repeated for each of a plurality of investors. Further, the method 500 may be performed for two or more investors combined (e.g., for a married coupled). The method 500 may be performed by an advisor using information provided to the advisor by one or more investors. While not a requirement, it may be desirable to perform the method 500 after the investor has retired or will be retiring soon. The method 500 may be repeated for an investor (or investors) occasionally (e.g., periodically). By way of a non-limiting example, it may be beneficial to perform the method 500 every year.

For ease of illustration, the method 500 will be described as being performed by the computing device 110. In first block 510, the computing device 110 obtains the funded ratio for one or more investors. The funded ratio may have been calculated by the method 200.

In decision block 520, the computing device 110 determines whether the funded ratio is greater than or equal to a minimum threshold value. By way of a non-limiting example, the minimum threshold value may be one. However, this is not a requirement and embodiments in which the minimum threshold value is greater than one (e.g., 1.1, 1.2, 1.3, and the like) are also within the scope of the present teachings.

The decision in decision block 520 is "YES" when the computing device 110 determines the funded ratio is greater than or equal to the minimum threshold value. If the funded ratio is greater than or equal to the minimum threshold value, the investor's retirement plan is likely to be adequately funded. In other words, the investor is not at risk of having an underfunded retirement plan. When the decision in decision block 520 is "YES," the computing device 110 advances to block 522.

On the other hand, the decision in decision block 520 is "NO" when the computing device 110 determines the funded ratio is less than the minimum threshold value. If the funded ratio is less than the minimum threshold value, the investor's retirement plan may not be adequately funded. In other words, the investor is at risk of having an underfunded retirement plan. When the decision in decision block 520 is "NO," the computing device 110 advances to decision block 550.

In block 522, the computing device 110 indicates that the investor's retirement plan may be adequately funded. For example, turning to FIG. 2C, the results screen 280 indicates the essential plan is "ON TRACK" because the funded ratio with respect to that plan is greater than the minimum threshold value. By way of another non-limiting example, the computing device 110 may display a graphic representation of the investor's funded ratio. The graphic representation may be color coded with a color (e.g., green) that indicates the investor's retirement plan may be fully funded. Because the investor's plan may be fully funded, the investor may wish to consider making an adjustment to the retirement plan that achieves a lower funded ratio. For example, the investor may consider increasing retirement spending, which would lower the funded ratio. Alternatively, the investor may decide not to make any adjustments to the retirement plan. Optionally, if the investor has at least some capacity for risk (e.g., at least some surplus), the investor may wish to consider different asset allocations to take on more risk. Returning to FIG. 5, after block 522, the computing device 110 advances to optional block 524.

Figure 6A:
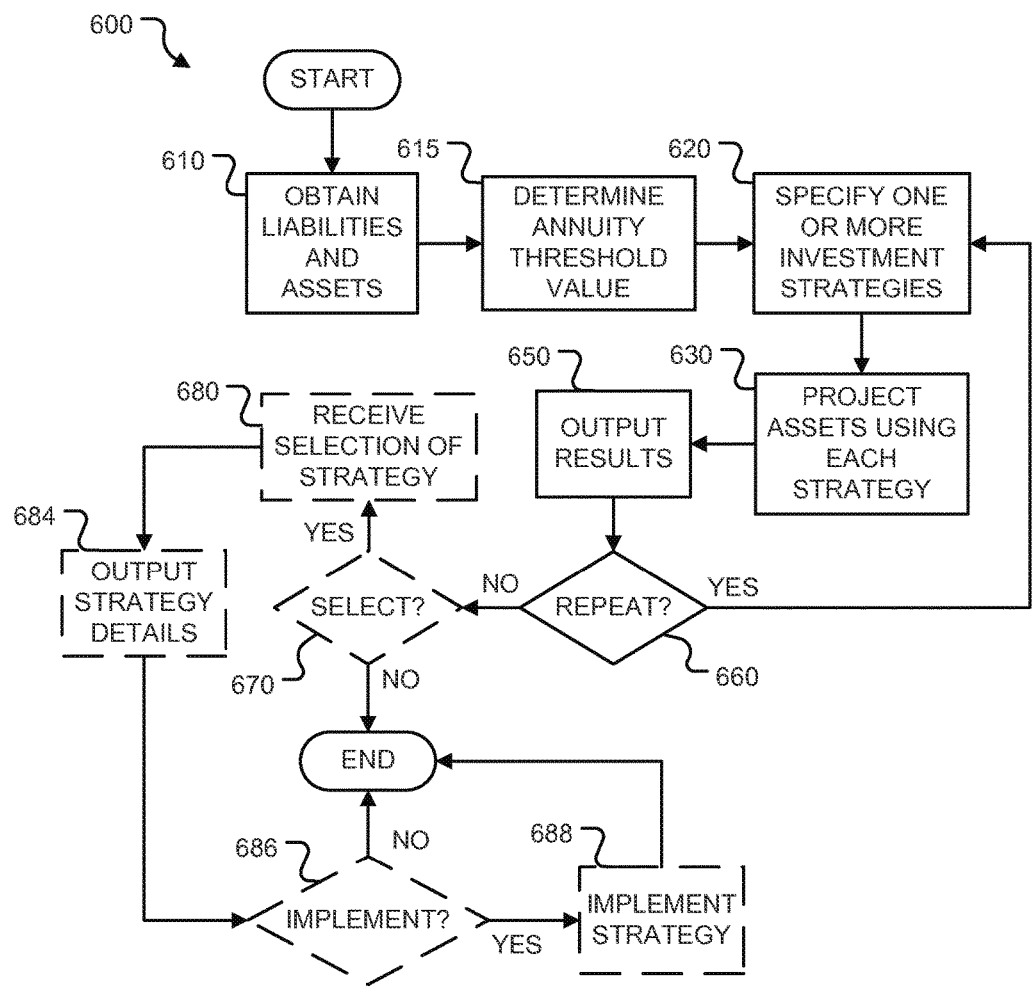
FIG. 6A is a flow diagram of a method evaluating investment strategies.

In optional block 524, the computing device 110 performs a method 600 illustrated in FIG. 6A, which may be used to evaluate an investment strategy and/or compare different investment strategies. Optionally, the investor may select an investment strategy to implement going forward. Then, the computing device 110 advances to decision block 560.

In decision block 550, the computing device 110 determines whether the present value of the investor's investment portfolio is greater than or equal to a significant risk threshold value. By way of a non-limiting example, the significant risk threshold value may be one. However, this is not a requirement and embodiments in which the significant risk threshold value is less than one (e.g., 0.9, 0.8, and the like) or greater than one (e.g., 1.01, 1.1, and the like) are also within the scope of the present teachings. The decision in decision block 550 is "YES" when the computing device 110 determines the present value of the investor's investment portfolio is greater than or equal to the significant risk threshold value. On the other hand, the decision in decision block 550 is "NO" when the computing device 110 determines the present value of the investor's investment portfolio is less than the significant risk threshold value. When the decision in decision block 550 is "YES," the computing device 110 advances to block 558. On the other hand, when the decision in decision block 550 is "NO," the computing device 110 advances to block 552.

In block 552, the computing device 110 indicates (e.g., displays or prints) that the investor is at significant risk of running out of retirement savings during retirement. For example, turning to FIG. 2C, the results screen 280 indicates the lifestyle plan is "OFF TRACK" because the funded ratio with respect to that plan is less than the significant risk threshold value. By way of another non-limiting example, the computing device 110 may display a graphic representation of the investor's funded ratio. The graphic representation may be color coded with a color (e.g., red) that indicates the investor is at significant risk of running out of retirement savings during retirement. If the investor is at significant risk of running out of retirement savings during retirement, the investor may wish to consider making an adjustment to the retirement plan that achieves a funded ratio that is greater than or equal to the minimum threshold value and/or the significant risk threshold value. Optionally, the investor may wish to consider different asset allocations to increase the future value of the investor's assets and/or preserve the investor's assets. While the investor is at significant risk of running out of retirement savings, the investor may purchase an annuity to provide income during the remainder of the investor's life. Returning to FIG. 5, optionally, in block 552, the computing device 110 may recommend (e.g., prints or displays) that the investor purchase an annuity.

After block 552, the computing device 110 may advance to optional block 524 whereat the investor may optionally evaluate an investment strategy and/or compare different investment strategies, including purchasing an annuity and/or investing in different asset allocations.

In block 558, the computing device 110 indicates that the investor's retirement plan may be underfunded. For example, turning to FIG. 2C, the results screen 280 may indicate "CAUTION" with respect to a plan in block 558. By way of another non-limiting example, the computing device 110 may display a graphic representation of the investor's funded ratio. The graphic representation may be color coded with a color (e.g., yellow) that indicates the investor's retirement plan may be underfunded. If the investor's retirement plan may be underfunded, the investor may wish to consider making an adjustment to the retirement plan that achieves a funded ratio that is greater than or equal to the minimum threshold value. Alternatively, the investor may decide not to make any adjustments to the retirement plan. Optionally, the investor may wish to consider different asset allocations to increase the future value of the investor's assets and/or preserve the investor's assets.

Returning to FIG. 5, after block 558, the computing device 110 may advance to optional block 524 whereat the investor may optionally evaluate an investment strategy and/or compare different investment strategies.

As mentioned above, in blocks 522, 552, and 558, the investor may wish to consider making an adjustment to the retirement plan. The investor has several options in blocks 522, 552, and 558 to modify the investor's retirement plan to provide adequate funding. If the investor has already retired, these options include adjusting liabilities by spending less in retirement (i.e., reduce the value of the variable "L"), and returning to work to reduce retirement liabilities, and potentially increase human capital (i.e., increase the value of the variable "H") if some wages can be saved. If the investor has not yet retired, the investor's options include saving more to increase the value of human capital (i.e., increase the value of the variable "H"), scaling back proposed retirement spending to reduce future liabilities (i.e., reduce the value of the variable "L"), and delaying retirement to increase human capital and reduce liabilities (i.e., increase the value of the variable "R"). Further, the investor may decide to purchase an annuity to at least partially fund retirement spending.

If the user wishes to evaluate an adjustment to the investor's retirement plan, the user may recalculate the funded ratio (e.g., using the method 200 illustrated in FIG. 2A). In decision block 560, the computing device 110 receives an indication via a user interface whether the user wishes to return to make an adjustment to the investor's retirement plan and repeat the analysis. Turning to FIG. 2C, the results screen 280 may include an "ADJUST PLAN" button (or similar user input component) that the user may select to indicate the user would like to make an adjustment.

Returning to FIG. 5, the decision in decision block 560 is "YES" when the indication indicates that the user wishes to make an adjustment to the investor's retirement plan and repeat the analysis. On the other hand, the decision in decision block 560 is "NO" when the indication indicates that the user does not wish to repeat the analysis. When the decision in decision block 560 is "YES," the computing device 110 advances to block 570.

In block 570, the computing device 110 receives one or more adjustments to the investor's retirement plan and then returns to block 510 to recalculate the funded ratio in view of the adjustments. In block 570, the user input screen 270 illustrated in FIG. 2B may be displayed. The user may enter adjustments to the investor's retirement plan in the user input screen 270. Then, the user my press the "SUBMIT" button to return to the block 510 to obtain the new funded ratio(s) and/or surplus values.

Returning to FIG. 5, on the other hand, when the decision in decision block 560 is "NO," the method 500 terminates.

An investment advisor may perform the method 200 (FIG. 2A) and/or the method 500 (FIG. 5) occasionally (e.g., annually) to monitor the funded ratios of investors advised by the advisor. Such monitoring may be performed by the computing device 110 automatically. The computing device 110 may generate output identifying any investors having funded ratios below the minimum threshold value and/or the significant risk threshold value. If the funded ratio of any investor indicates the investor may be at risk of running out of funds during retirement, the advisor can contact the investor. Optionally, the minimum threshold value and/or the significant risk threshold value may be specified by the investment advisor.

Evaluating Investment Strategies Using an Annuity Threshold Value

As explained above, funded ratio is not calculated using market projections. Instead, the net present value of the investor's financial assets is used to value the investor's assets, and the net present value of future liabilities (e.g., a market price, or actuarial net present value of a stream of future payments) is used to value future liabilities. Thus, if the investor has an investment portfolio valued today at $500,000, this value is used without regard to how the value of the portfolio might increase in the future based on a particular investment strategy.

However, the insight of using funded ratio to evaluate a retirement plan may also be used to compare different investment strategies. For example, the net present value of the investor's financial assets may be projected into the future (e.g., 10 years) according to one or more investment strategies. Similarly, the net present value of future liabilities (e.g., the value of the variable "L") may also be projected into the future by the same amount of time that the investor's assets were projected. Then, if desired, a projected funded ratio and/or a projected surplus may be calculated.

The projected net present value of future liabilities may be used as an annuity threshold value. For example, the annuity threshold value may be set equal to a projected market price of an immediate life annuity at a future date. Alternatively, the annuity threshold value may be set equal to a projected actuarial net future value of a portion of the investor's future liabilities that occur (or become due) after the future date.

The annuity threshold value may be used to evaluate different investment strategies. Strategies that result in the future value of an investor's assets being less than the annuity threshold value place the investor at significant risk of running out of money during retirement. On the other hand, strategies that result in the future value of an investor's assets being greater than the annuity threshold value may provide adequate retirement resources.

FIG. 6A is a flow diagram of the method 600 performed by a computing device. For ease of illustration, the method 600 will be described as being performed by the computing device 110. In first block 610, the computing device 110 obtains the net present value of the investor's financial assets, and the net present value of future liabilities. These values may be obtained using the methods 200, 300, and 400 described above with respect to FIGS. 2A, 3A, and 4.

Optionally, the computing device 110 may give the user the option to select a period (e.g., 10 years) over which to project the values of the investor's assets and liabilities. For ease of illustration, the method 600 will be described as using a 10-year period. However, this is not a requirement.

In block 615, the computing device 110 determines the annuity threshold value (e.g., a projected market price of an immediate life annuity sufficient to fund the investor's future liabilities, a projected actuarial net future value of the investor's future liabilities, and the like). The annuity threshold value is adequate to purchase an immediate life annuity at the projected future date (e.g., ten years in the future) sufficient to fund the investor's future liabilities from the projected future date onward.

Figures 6B, 6C:
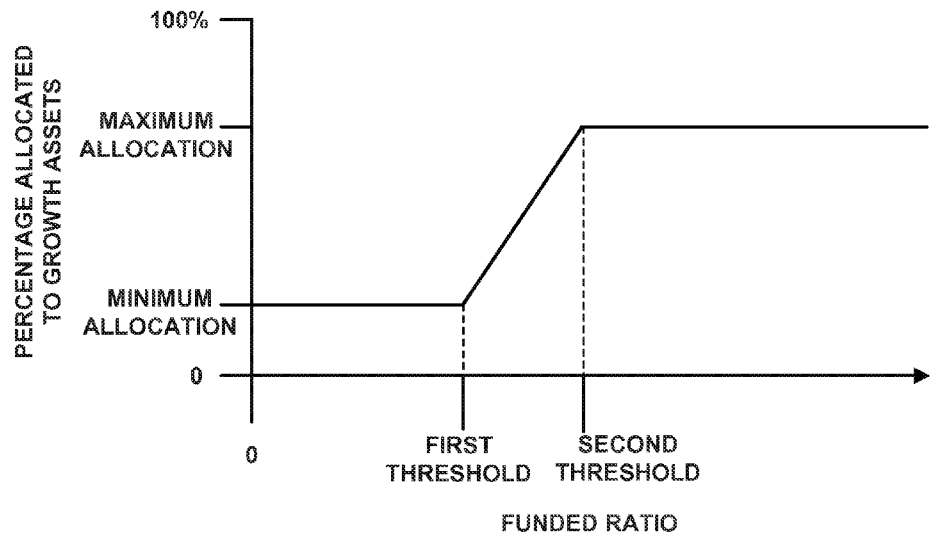
FIG. 6B is a graph illustrating an investment strategy based on funded ratio.
FIG. 6C is an illustration of an exemplary investment strategies input screen.

In block 620, one or more investment strategies are specified by the user and communicated (e.g., via a user interface) to the computing device 110. Turning to FIG. 6C, in block 620, an investment strategies input screen 690 may be displayed to the user. The user may enter information into the investment strategies input screen 690 defining one or more investment plans to be evaluated. For ease of illustration, in block 620, the computing device 110 receives identifications of two investment strategies: a first investment strategy (referred to as a "Proposed Plan") and a second investment strategy (referred to as a "Traditional Asset Allocation Plan"). The first investment strategy invests 100% in accordance with a Retirement Income Model Strategy ("RIMS"), described below. The second investment strategy invests 100% in accordance with the Traditional Asset Allocation Strategy. However, other plans may be specified. For example, FIG. 6C illustrates an "Alternate Portfolio." In the example illustrated, the investor decided to invest a portion of the Alternate Portfolio in three different investment strategies: RIMS; a Traditional Asset Allocation Strategy; and a Simulated Immediate Lifetime Annuity. After one or more strategies have been specified by the user, a "GENERATE RESULTS" button (or similar user input component) may be selected to indicate the user has finished defining the portfolios and wishes to proceed with the method 600.

The computing device 110 may be configured to project the future value of the investor's assets according to any number of investment strategies. For example, the computing device 110 may be configured to use any of the following investment strategies and/or combinations thereof:
1. RIMS (which uses an adaptive investing methodology);
2. the Traditional Asset Allocation Strategy;
3. Simulated Bond Ladder Strategy;
4. Simulated Immediate Lifetime Annuity Strategy;
5. an asset allocation based on the present funded ratio; and
6. a custom investment strategy.

The RIMS uses the adaptive investing methodology (described below) and dynamically manages the risk that the value of the portfolio will drop below the annuity threshold value. This type of strategy adjusts the asset allocation of a portfolio as circumstances change to improve the sustainability of portfolio withdrawals. U.S. patent application Ser. No. 13/250,426, filed on Sep. 30, 2011, and incorporated herein in its entirety, describes an adaptive investing methodology that may be used to determine a set of wealth tables. The set of wealth tables may be used to determine asset allocations for individual investors. The methodology uses a model that considers a finite retirement period (e.g., 20 years). At the end of this period, the model assumes an annuity is purchased that will provide income for the investor beyond the retirement period. The asset allocations are determined at least in part by maximizing the income from the annuity (thus, providing the most income to the investor after the retirement period). This method is explained in detail below. By way of non-limiting example, the adaptive investing methodology may allocate a first portion of the assets to growth assets, a second portion to capital preservation assets, and a third portion to cash.

The Traditional Asset Allocation Strategy is a static allocation of the investor's assets in a predetermined set of asset classes. For example, the static allocation may allocate a first portion of the assets to growth assets, a second portion to capital preservation assets, and a third portion to cash. Many traditional asset allocation approaches are based on risk tolerance, which describes the investor's attitude toward market volatility. With this approach, a risk tolerance score is mapped to a risk profile (e.g., a conservative profile, a moderate profile, or an aggressive profile). The risk profile is linked to predefined, static asset allocations. For example, the moderate profile may be linked to an asset allocation that is 40% equities and 60% fixed income assets. The investor's portfolio is invested according to the predefined, static asset allocations.

However, during retirement, risk tolerance profiles (e.g., a conservative profile, a moderate profile, or an aggressive profile) may not be as useful as they are pre-retirement. Instead, an investor's risk capacity (or capacity to handle market risk) may be more important. The surplus value, which is a measure of the size of an investor's assets relative to the investor's spending goals, may be used to determine risk capacity. The funded ratio may also be used as a measure of risk capacity. A higher funded ratio corresponds to a greater capacity to handle appropriate market risk. This does not indicate an investor should engage in reckless investing, but should consider an asset allocation including a larger portion of equities (which may take advantage of longer-term growth opportunities provided by equities). Conversely, a lower funded ratio corresponds to less risk capacity. Investors with less risk capacity should consider an asset allocation including a larger portion of fixed income assets.

FIG. 6B is a graph illustrating an investment strategy based on the investor's present funded ratio. As will be explained below, the investment strategy illustrated in FIG. 6B may be characterized as a generalization or abstraction of a RIMS wealth table generated by the adaptive investing methodology described below. In FIG. 6B, a minimum allocation (e.g., 20%) and a maximum allocation (e.g., 70%) to growth assets (e.g., equities) have been defined. The portfolio may be characterized as divided into two portions: a first portion invested in growth assets (e.g., equities); and a second portion invested in capital preservation assets (e.g., bonds). If the present funded ratio is less than a first threshold (e.g., one), the size of the first portion of the portfolio may correspond to the minimum allocation (e.g., 20%). However, if the funded ratio is greater than the first threshold but less than a second threshold, the size of the first portion of the portfolio may be greater than the minimum allocation and less than or equal to the maximum allocation. The second threshold is greater than the first threshold value. If the funded ratio is greater than the second threshold, the size of the first portion of the portfolio may correspond to the maximum allocation (e.g., 70%).

The custom investment strategy may be specified by the investor and/or the investment advisor. For example, the investor and/or investment advisor may specify a custom static asset allocation or an asset allocation that changes over time. Such asset allocations indicate which portion of a portfolio is to be invested in growth assets and which portion is to be invested in capital preservation assets.

It is important to note that the investor's funded ratio should be reevaluated occasionally (e.g., annually). Even if a retired investor has a funded ratio greater than one, at least two factors could cause the funded ratio to decrease to below one:

1. a drop in the market that decreases asset values (the value of the variable "A")
2. a drop in interest rates that increases liabilities (the value of the variable "L").

Therefore, the investor and/or an advisor may adjust the investor's investment strategy to avoid a funded ratio that is less than one. For example, the investor could purchase an immediate life annuity that would cover expected liabilities. This approach would eliminate investment risk and longevity risk. However, there would still be exposure to inflation risk and default (or counterparty) risk. A life annuity insures that an investor will not run out of funds no matter how long the investor lives nor how much markets fluctuate. While many investors prefer this certainty, many investors also dislike the inflexibility of this approach. The second group of investors prefers to actively manage their assets. Further, if an investor has a sufficient surplus, there is value to deferring purchasing an annuity. Milevsky M. A. and V. R. Young, *Optimal Asset Allocation and the Real Option to Delay Annuitization*, Working Paper (2002), incorporated herein in its entirety.

Instead of purchasing an annuity, the investor's assets may be managed to control the risk that funded ratio would drop below the annuity threshold value in the future. For example, investment managers may construct a portfolio that moves in tandem with the value of the investor's liabilities to reduce the risk that the value of the portfolio will drop below the annuity threshold value.

Investing during retirement poses different challenges than investing for (or in anticipation of) retirement. Balancing the trade-offs between growth, income, and capital preservation may be critical during retirement. When an investor is trying to grow the investor's assets, a key challenge is managing the volatility of the portfolio. This is one of the reasons it is desirable to diversify investments. Although diversification does not guarantee all losses will be avoided, it can avoid large losses (and gains) caused by volatility, and help investors stick to long-term investment strategies. However, during retirement, the key investment challenge is making sure assets last as long as the investor needs them.

Because the values of assets change over time, the investor's portfolio may be rebalanced occasionally (e.g., periodically) to correspond to the predefined asset allocations.

Returning to FIG. 6A, in block 630, the computing device 110 determines the future value of the investor's assets using each of the investment strategies specified in block 620. In other words, the computing device 110 executes a forecasting methodology that assumes the investor's assets are invested according to each strategy, and outputs a projected asset value. As is apparent to those of ordinary skill in the art, some investors will own assets (e.g., annuities, real property, and the like) that are not investable according to an investment strategy. Nevertheless, in block 630, the computing device 110 projects the value of such assets as well as those invested according to the selected methodologies into the future. Methods for projecting the future value of assets (e.g., growth assets and capital preservation assets) are described below with respect to the adaptive investing methodology.

Figure 8A:
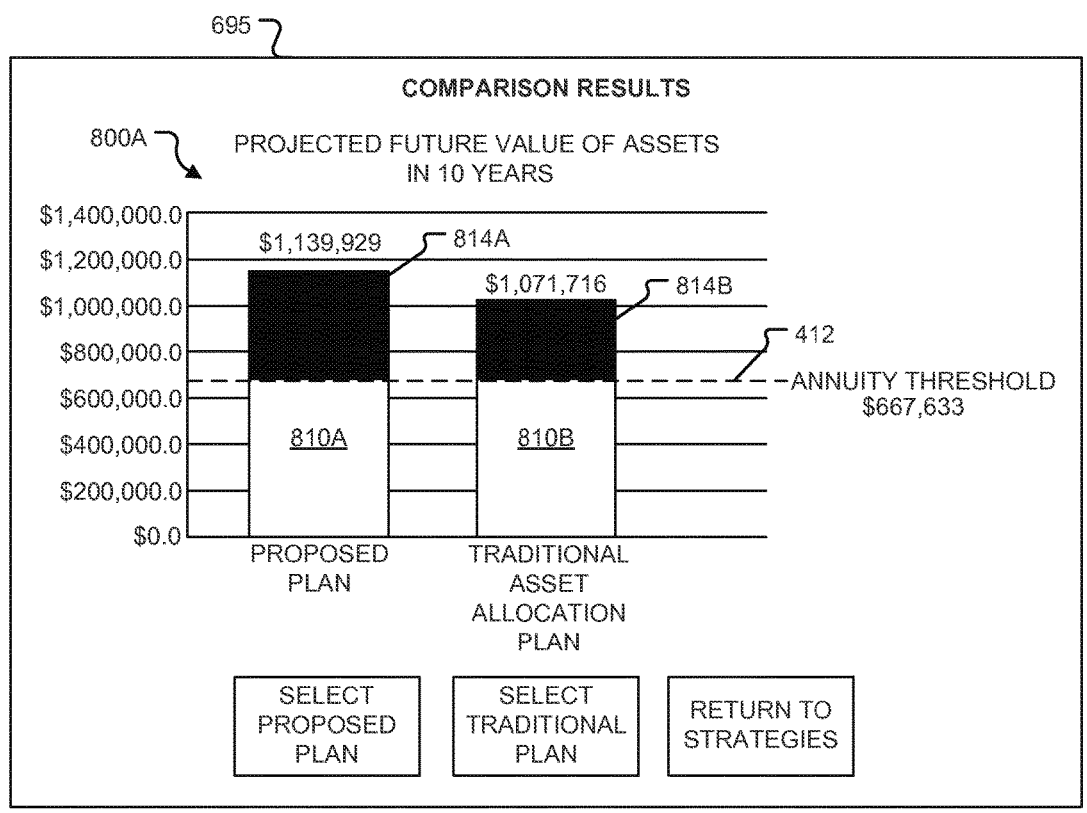
FIG. 8A is a bar graph depicting ending wealth (after 10 years) for a 65-year-old couple that withdraws 3.75% from their portfolio each year (with a 2.5% annual cost of living increase) generated by an asset allocation (left) determined using an adaptive investing methodology, and a static asset allocation (right).
Figure 8B:
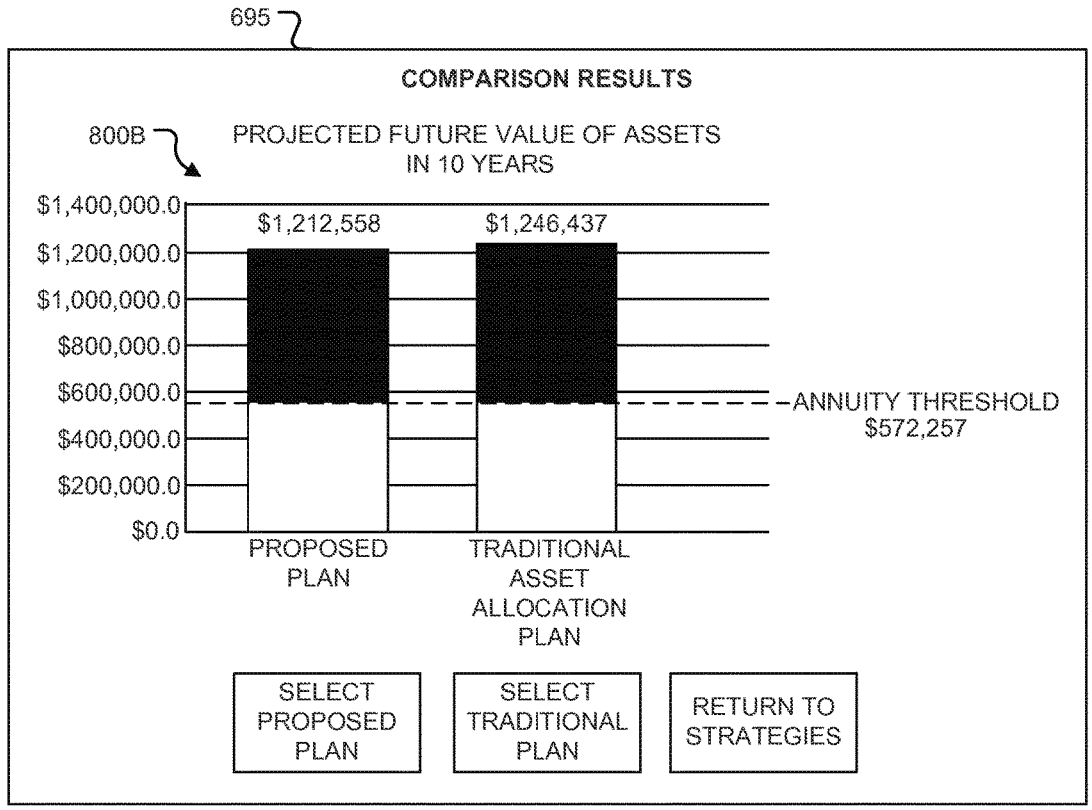
FIG. 8B is a bar graph depicting ending wealth (after 10 years) for a 65-year-old couple that withdraws 3% from their portfolio each year (with a 2.5% annual cost of living increase) generated by an asset allocation (left) determined using an adaptive investing methodology, and a static asset allocation (right).

In block 650, the computing device 110 outputs the projected future value of the investor's assets predicted for each investment strategy. The computing device 110 may also output the annuity threshold value so that the projected future value(s) of the investor's assets may be compared to the annuity threshold value. FIGS. 8A and 8B each depict a comparison results screen 695 that may be generated by the computing device 110 in block 650.

Turning to FIG. 8A, the comparison results screen 695 displays a bar graph 800A that depicts ending wealth (after 10 years) for a 65-year-old couple that withdraws 3.75% from their investment portfolio each year (with a 2.5% annual cost of living increase) generated by the first investment strategy (labeled "Proposed Plan") and the second investment strategy (labeled "Traditional Asset Allocation Plan"). In this example, the first investment strategy is the RIMS, and the second investment strategy is a static asset allocation.

In FIG. 8A, a first bar 810A corresponds to the projected future value of the investor's assets (which in this example is $1,139,929) when invested using the first investment strategy (labeled "Proposed Plan"), and a second bar 810B corresponds to the projected future value of the investor's assets (which in this example is $1,071,716) when invested using the second investment strategy (labeled "Traditional Asset Allocation Plan"). A dashed line 412 illustrates the annuity threshold value (which in this example is $667,633). Thus, a first solid (or black) portion 814A of the bar 810A identifies a surplus amount (which in this example is $472,296) that is projected to be in the investment account if the account was invested according to the first investment strategy. A second solid (or black) portion 814B of the second bar 810B identifies a surplus amount (which in this example is $404,083) that is projected to be in the investment account if the account was invested according to the second investment strategy. Because the first solid portion 814A is larger than the second solid portion 814B, according to the projections, the first investment strategy increased the value of the investor's assets more than the second investment strategy.

Turning to FIG. 8B, the comparison results screen 695 displays a bar graph 800B that depicts ending wealth (after 10 years) for the 65-year-old couple when instead of withdrawing 3.75% (as in FIG. 8A) the couple withdraws 3% from their investment portfolio each year (with a 2.5% annual cost of living increase) generated by the first investment strategy (labeled "Proposed Plan") and the second investment strategy (labeled "Traditional Asset Allocation Plan"). In FIG. 8A, the first investment strategy increased the value of the investor's assets more than the second investment strategy. In FIG. 8B, the opposite is true. The second investment strategy increased the value of the investor's assets more than the first investment strategy Returning to FIG. 6A, in decision block 660, the computing device 110 receives an indication indicating whether the user would like to evaluate one or more additional investment strategies. As illustrated in FIGS. 8A and 8B, the comparison results screen 695 may include a "RETURN TO STRATEGIES" button (or similar user input component) that may be selected to indicate that the user would like to evaluate one or more additional investment strategies. Returning to FIG. 6A, the decision in decision block 660 is "YES" when the indication indicates the user would like to evaluate one or more additional investment strategies. On the other hand, the decision in decision block 660 is "NO" when the indication indicates the user would not like to evaluate any additional investment strategies.

When the decision in decision block 660 is "YES," the computing device 110 returns to block 620 whereat the user specifies one or more investment strategies.

When the decision in decision block 660 is "NO," the computing device 110 advances to optional decision block 670.

In optional decision block 670, the computing device 110 receives an indication indicating whether the user would like to select one of the investment strategies. The comparison results screen 695 illustrated in FIGS. 8A and 8B may include one or more buttons (or similar user input components) that may be selected to indicate the user would like to select one of the investment strategies. In FIGS. 8A and 8B, the comparison results screen 695 includes a "SELECT PROPOSED PLAN" button that may be selected to indicate the user would like to select the first investment strategy, and a "SELECT TRADITIONAL PLAN" button that may be selected to indicate the user would like to select the second investment strategy. Returning to FIG. 6A, the decision in optional decision block 670 is "YES" when the indication indicates the user would like to select one of the investment strategies. On the other hand, the decision in optional decision block 670 is "NO" when the indication indicates the user would not like to select one of the investment strategies.

When the decision in optional decision block 670 is "NO," the method 600 terminates.

When the decision in optional decision block 670 is "YES," in optional block 680, the computing device 110 receives (e.g., via a user interface) a selection of a strategy. As mentioned above, which button (e.g., the "SELECT PROPOSED PLAN" button or the "SELECT TRADITIONAL PLAN" button) is selected on the comparison results screen 695 may indicate which of the strategies has been selected.

In optional block 684, the computing device 110 outputs details related to the strategy identified in block 680. Optionally, the details may be used to manage the investor's assets in accordance with the strategy selected in block 680. FIG. 6D illustrates a strategy details screen 698 with a table 699 illustrating the first eight periods (e.g., quarters) of asset allocations that may be used to implement the RIMS for the investor's portfolio. The table 699 includes forecasted returns and withdrawal amounts for each period.

Returning to FIG. 6A, in optional decision block 686, the computing device 110 receives an indication indicating whether the user would like to implement the selected investment strategy. Returning to FIG. 6D, the strategy details screen 698 includes an "Implement Strategy" button (or similar user input component) that may be selected to indicate the user would like to implement the selected investment strategy. The decision in decision block 686 is "YES" when the user would like to implement the selected investment strategy. On the other hand, the decision in decision block 686 is "NO" when the user decides not to implement the selected investment strategy.

When the decision in decision block 686 is "NO," the method 600 terminates.

When the decision in decision block 686 is "YES," in optional block 688, the computing device 110 automatically implements the selected investment strategy. For example, the asset allocation for the first period may be provided to conventional investment software as a target portfolio. The investment software may automatically make trades that will bring the investor's portfolio into agreement with the target portfolio. Alternatively, the investor and/or the investment advisor may manually identify and enter trades that will bring the investor's portfolio into agreement with the target portfolio. Before the beginning of the next period, the asset allocation of the next period is identified as the target portfolio. Then, the investor's portfolio may be brought into agreement with the asset allocation in the target portfolio at the beginning of the next period. This may be repeated for a desired number of periods.

Then, the method 600 terminates.

The method 600 may be repeated to evaluate different retirement plans by projecting them into the future. Further, the method 500 illustrated in FIG. 5 may be repeated as desired to evaluate different retirement plans. The method 600 may be performed as part of the method 500 and used to evaluate different investment strategies for each of the retirement plans.

System

FIG. 1 is a diagram of a retirement planning system 100 and a system 150 that may be used to implement an adaptive investing methodology (described below). The system 100 includes the computing device 110 operated by a retirement planning entity, a computing device 120A operated by an advisor, and the computing device 120B operated by an investor. The computing device 110 may be configured to implement a web server (or connected to another computing device configured to implement a web server). The computing device 110 is configured to communicate with the computing devices 120A and 120B via a network 190. Each of the computing devices 120A and 120B may implement a web browser application configured to receive web pages from the computing device 110 and display them. Each of the computing devices 110, 120A, and 120B may be implemented as a computing device 12 (described below). The system 150 is described in detail below.

The retirement planning system 100 implements a retirement planning application that may be characterized as having two components: (1) a retirement lifestyle planner, and (2) a Retirement Income Model Strategy ("RIMS") application.

Retirement Lifestyle Planner

The retirement lifestyle planner may be implemented as a web-based planning and illustration tool designed for an advisor or registered representative to use. However, the retirement lifestyle planner is not restricted to use by anyone in particular. For example, an investor may use the retirement lifestyle planner. For ease of illustration, the retirement lifestyle planner will be described as being used by a user (that may include an advisor, a registered representative, an investor, and the like).

The retirement lifestyle planner may be configured to implement the methods 200, 300, 400, 500, and 600 illustrated in the FIGS. 2A, 3A, 4, 5, and 6A respectively. Thus, the retirement lifestyle planner produces output that can be used with investors and may help advisors better understand the long-term viability of an investor's spending plan. For example, the retirement lifestyle planner may generate the screens 270, 280, 690, 695, and 698 illustrated in FIGS. 2B, 2C, 6C, 8A, and 6D, respectively. As explained above, the computing device 110 may generate these screens, which may be displayed by one or more of the computing devices 110, 120A, and 120B.

The retirement lifestyle planner may be used to evaluate and/or compare one or more potential investment strategies based on input obtained from the investor. These investment strategies may include, but are not limited to, the RIMS. The RIMS application implements an investment strategy that may be selected in block 620 and the optional block 680 of the method 600 illustrated in FIG. 6A. However, other investment strategies (such as those discussed above) may be selected in these blocks of the method 600.

The retirement lifestyle planner may generate a web interface (e.g., the user input screen 270 illustrated in FIG. 2B) into which the user inputs the user input received in block 210 of the method 200. The retirement lifestyle planner may generate a web interface (e.g., the results screen 280 illustrated in FIG. 2C) that outputs (e.g., displays) the funded ratio and/or surplus value in block 260 of the method 200.

Turning to FIG. 5, the retirement lifestyle planner may generate a web interface (e.g., the user input screen 270 illustrated in FIG. 2B) into which the user inputs an adjustment to the investor's retirement plan in block 570 of the method 500. The retirement lifestyle planner may generate a web interface (e.g., the results screen 280 illustrated in FIG. 2C) into which the user inputs an indication as to whether the user wishes to adjust the investor's retirement plan in decision block 560 of the method 500. Optionally, the retirement lifestyle planner may generate a web interface (e.g., the results screen 280 illustrated in FIG. 2C) into which the user inputs an indication as to whether the user wishes to perform the method 600 in optional block 524 of the method 500.

Turning to FIG. 6A, the retirement lifestyle planner may generate a web interface (e.g., the investment strategies input screen 690 illustrated in FIG. 6C) into which the user inputs a selection of one or more investment strategies in block 620 of the method 600. The retirement lifestyle planner may generate a web interface (e.g., the comparison results screen 695 illustrated in FIGS. 8A and 8B) into which the user inputs a selection of an investment strategy in optional block 680 of the method 600. The retirement lifestyle planner may generate a web interface (e.g., the comparison results screen 695 illustrated in FIGS. 8A and 8B) into which the user inputs an indication as to whether the user wishes to analyze one or more additional investment strategies in decision block 660 of the method 600.

The retirement lifestyle planner may generate a proposed retirement lifestyle plan designed for use with investors. The proposed retirement lifestyle plan may include information and analysis results that may be discussed by the investor and investment advisor. For example, the retirement lifestyle planner may generate a web interface (e.g., the results screen 280 illustrated in FIG. 2C) displaying the indications determined by the computing device 110 in blocks 522, 552, and 558 of the method 500 (see FIG. 5). Optionally, the retirement lifestyle planner may generate a web interface (e.g., the comparison results screen 695 illustrated in FIGS. 8A and 8B) displaying the results output by the computing device 110 in block 650 of the method 600 (see FIG. 6A) and/or a web interface (e.g., the strategy details screen 698 illustrated in FIG. 6D) displaying the investment strategy details output in optional block 684 of the method 600 (see FIG. 6A).

Further, the retirement lifestyle planner may be used to implement a selected investment strategy. For example, the retirement lifestyle planner may generate a web interface (e.g., the strategy details screen 698 illustrated in FIG. 6D) that may be used in decision block 686 of the method 600 (see FIG. 6A) to indicate the investor wishes to automatically implement the selected investment strategy.

Retirement Income Model Strategy ("RIMS") Application

Traditionally, risk was measured as a standard deviation, and reward was measured as an expected return. However, in the context of a lifetime spending plan, risk may be measured in terms of an investor falling short of the investor's spending goals and reward may be measured in terms of the investor's potential wealth in excess of those goals. The respective technical labels for these are shortfall and surplus wealth. They are risk and reward measures more aligned with what a retired investor typically needs from his portfolio.

The risk of shortfall is dynamic in nature and changes continually as the portfolio value changes through time. For example, a 4% withdrawal rate may be sustainable at the start of retirement, but if the portfolio value drops due to market movement or a lump sum withdrawal, the withdrawal rate may quickly increase to a level at which it is unsustainable.

By adopting different definitions of risk and reward for retired investors, it follows that the asset allocation process would also differ.

Based on commissioned end investor market research, it has been determined that most retired investors have three primary investment goals in retirement. They want consistent income replacement (predictability), a low risk of outliving their assets (sustainability), and flexibility to respond to changing future needs (liquidity). A total return approach (that relies on dividends and appreciation from the equity part of a portfolio and income and appreciation from the fixed income part of a portfolio) is a practical choice for many investors. Such an approach offers a different combination of tradeoffs that may appeal to investors with those three stated needs.

The RIMS application implements the RIMS, which uses a set of wealth tables (described below) generated by an adaptive investment methodology (described below) to determine asset allocations for the investor. As will be explained below, asset allocations may be determined for an individual investor by looking up values of predetermined investor variables in the set of wealth tables. In other words, the set of wealth tables associate asset allocations with the values of the predetermined investor variables.

By way of a non-limiting example, the predetermined investor variables may include one or more of an investor's age, an investor's current contribution or savings rate, an investor's current income, an investor's account balance, an investor's anticipated retirement spending during retirement. Optionally, the investor's gender may be required to determine the market price of the annuity used by a model (described below) that generates the set of wealth tables. During retirement, both the investor's current savings rate, and the investor's current income may be zero. The value of the investor's anticipated retirement spending during retirement may be used to determine a withdrawal rate (e.g., 3%). As discussed above, if the investor has post retirement income (e.g., social security), such income may be subtracted from a proposed retirement spending plan to arrive at an amount to be withdrawn from an investment portfolio. The amount to be withdrawn may be divided by the investor's account balance to obtain the withdrawal rate. Alternatively, a predetermined withdrawal rate may be used (e.g., 4.2%).

Thus, for some investors, asset allocations may be looked up in the set of wealth tables based only on the period and an amount of wealth of the investor at the end of the previous period.

The model (discussed below) used to generate the set of wealth tables may be updated occasionally (e.g., quarterly) based on current market levels and future asset class forecasts to help provide sustainable, but not guaranteed, withdrawals over the life of the retirement plan while managing the risk of running out of money. In simple terms, the asset allocation at the model strategy level changes each period based on the value of the model (as defined by a "synthetic" NAV), a withdrawal amount for the period, and asset class forecasts. This synthetic NAV is not published. It is used internally to track the value of the model over time.

While the set of wealth tables may used to identify a personalized set of asset allocations for the investor over a predetermined length of time, the inventors have determined that a single wealth table (referred to as a "RIMS wealth table") may be used by the RIMS application for all investors. Essentially, values are determined for a representative investor, and the asset allocations determined for the representative investor are used for all investors. The RIMS application and/or adaptive investing methodology generate the RIMS wealth table for the representative investor using the following values and/or assumptions. The representative investor is a married male/female couple both 62-years-old. A 2.5% cost of living adjustment is applied to retirement spending. A starting wealth of $100 is used (which may be scaled to a particular investor's actual portfolio value). The withdrawal amount is $4.20 annually and $1.05 is applied each quarter. The $1.05 applied each quarter is adjusted for cost of living. A 1% annual (0.25% quarterly) advisory fee is applied to the value of the portfolio. A survivorship spending goal of 75% is used.

Table 3 (below) provides a portion of an exemplary RIMS wealth table. The second column from the left lists value numbers for allocations within a period (which in this example is a quarter). The first quarter of the exemplary RIMS wealth table includes two hundred values numbered from one to two hundred. As indicated in Table 3, selected values have been omitted from Table 3 to reduce the size of the table. The second quarter includes four hundred values of which only three are listed in Table 3. The values for the other quarters have been omitted. By way of a non-limiting example, the wealth table may include allocations for each period within a predetermined length of time (e.g., 10 years).

TABLE 3

| Quarter No. | Value No. in Wealth Table | Wealth (Dollars) | Growth Assets | Capital Preserving Assets | Cash |
|---|---|---|---|---|---|
| 0 | 1 | 100.00 | 43% | 55% | 2% |
| 1 | 1 | 64.13 | 38% | 60% | 2% |
| 1 | 25 | 71.99 | 29% | 69% | 2% |
| 1 | 35 | 75.26 | 27% | 71% | 2% |
| 1 | 55 | 81.81 | 24% | 74% | 2% |
| 1 | 75 | 88.35 | 26% | 72% | 2% |
| 1 | 100 | 96.53 | 37% | 61% | 2% |
| 1 | 120 | 103.08 | 52% | 46% | 2% |
| 1 | 135 | 107.99 | 64% | 34% | 2% |
| 1 | 140 | 109.63 | 68% | 30% | 2% |
| 1 | 145 | 111.26 | 70% | 28% | 2% |
| 1 | 175 | 121.08 | 70% | 28% | 2% |

TABLE 3-continued

| Quarter No. | Value No. in Wealth Table | Wealth (Dollars) | Growth Assets | Capital Preserving Assets | Cash |
|---|---|---|---|---|---|
| 1 | 200 | 129.27 | 70% | 28% | 2% |
| 2 | 1 | 46.32 | 70% | 28% | 2% |
| 2 | 25 | 53.70 | 54% | 44% | 2% |
| 2 | 400 | 169.01 | 70% | 28% | 2% |

Figure 7A:
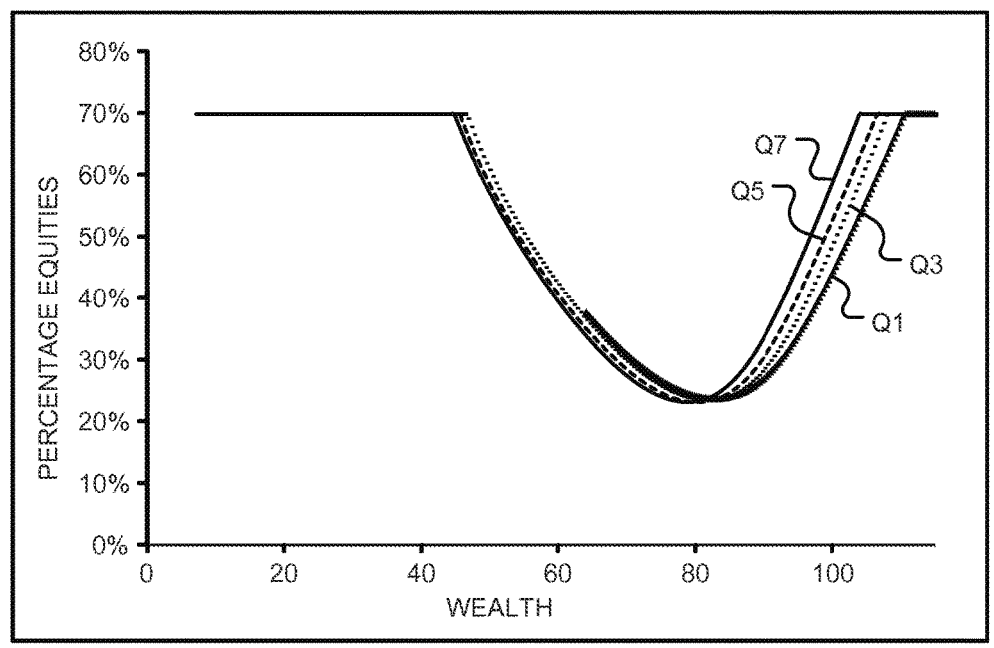
FIG. 7A is a graph of a RIMS wealth table illustrating asset allocations associated with different periods (e.g., quarters) and wealth values at a start of each period.
Figure 10:
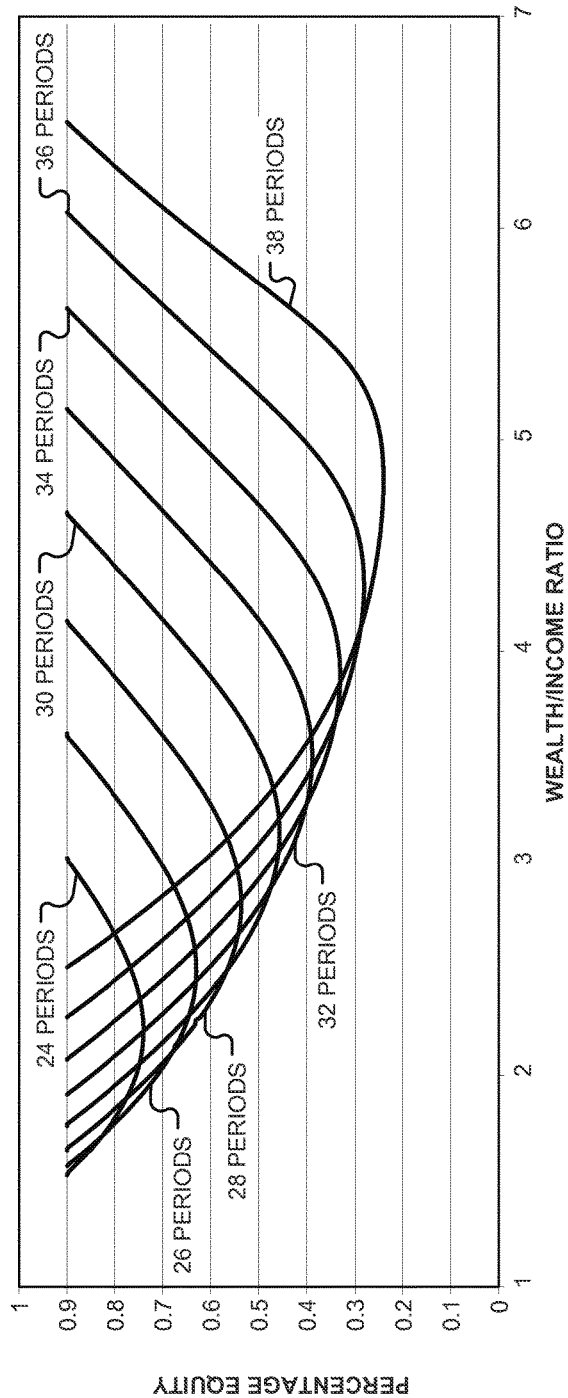
FIG. 10 is a graph of a set of wealth tables for a particular savings rate and a particular anticipated retirement spending illustrating asset allocations based on three predetermined investor variables: an investor's age; current income; and account balance.

FIG. 7A is plot of an allocation to growth assets (third column from the right of Table 3) for the first, third, fifth, and seventh quarters. In FIG. 10 described below with respect to the adaptive investing methodology, the x-axis is a ratio of wealth to income and each curved path corresponds to a different number of periods until retirement. Returning to FIG. 7A, the x-axis is the amount of wealth (or alternatively, the funded ratio), and each curved path corresponds to a different quarter. The y-axis of both FIG. 10 and FIG. 7A is percentage allocated to growth assets (e.g., equities).

The computing device (e.g., the computing device 110) executing the RIMS application may be a recipient of the set of wealth tables (which in some implementations may include only the RIMS wealth table). Optionally, the RIMS application may be configured to perform a method 1260 depicted in FIG. 14. Alternatively, the RIMS application (and/or the retirement lifestyle planner) may display the asset allocations to the user, who may make any changes indicated to the portfolio.

Figure 7B:
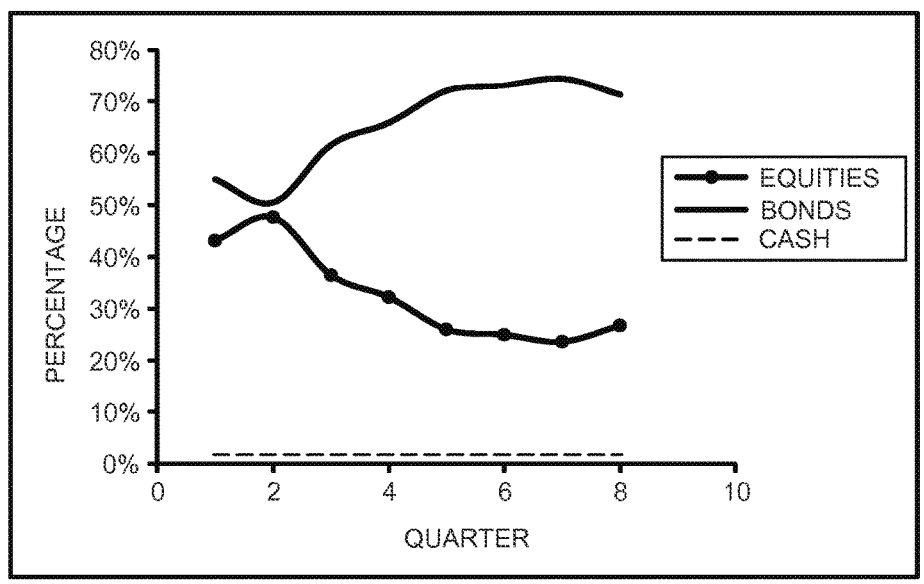
FIG. 7B is a graph of the asset allocations listed in the table of FIG. 6D.

The RIMS application uses the RIMS wealth table to determine a set of asset allocations for each period (e.g., quarter). For example, the RIMS application starts with an initial end wealth value of $100. The RIMS application looks up a first asset allocation for this initial end wealth value in the first quarter. Then, the RIMS application performs a market simulation that calculates a first end wealth value for the first quarter using the first asset allocation. Next, the RIMS application looks up a second asset allocation, which (in the RIMS wealth table) is associated with the first end wealth value in the second quarter. Then, the RIMS application simulates the second quarter (using the second asset allocation) and calculates a second end wealth value. Next, the RIMS application looks up a third asset allocation, which (in the RIMS wealth table) is associated with the second end wealth value in the third quarter. This process is repeated until an asset allocation is determined for each quarter within the predetermined length of time (e.g., 10 years). Returning to FIG. 6D, the exemplary asset allocations in table 699 were generated using this process. FIG. 7B is a graph of the asset allocations in table 699.

As mentioned above, the graph illustrating the investment strategy based on the investor's present funded ratio of FIG. 6B may be generated by abstracting (or simplifying) the RIMS wealth table. For example, along the x-axis, funded ratio may be substituted for wealth by dividing the wealth values by the withdrawals (or liabilities). Both the wealth values and the liability values were specified for a representative investor above. Next, if the funded ratio is less than the first threshold value, the minimum allocation to growth assets may be used. Further, if the funded ratio is greater than the second threshold value, the maximum allocation to growth assets may be used. The allocation to growth assets between the first and second threshold values may be determined using the allocations in the RIMS wealth table. For example, a linear regression or other analysis methodology may be used to produce a relationship (e.g., a linear relationship) between funded ratio and allocation to growth assets for funded ratios between the first and second threshold values.

In some implementations, the values of the graph of FIG. 6B may be used by the RIMS application instead of the values in the RIMS wealth table. In such implementations, after a quarter is simulated, the funded ratio is calculated and used to determine an asset allocation. If the funded ratio is less than the first threshold value, the minimum allocation to growth assets may be used. On the other hand, if the funded ratio is greater than the second threshold value, the maximum allocation to growth assets may be used. If the funded ratio is between the first and second threshold values, the relationship between funded ratio and allocation to growth assets may be used to determine the asset allocation.

Market movements will raise or lower the withdrawal rate, which will cause an adjustment in asset allocation in response. If the withdrawal rate increases, the RIMS application will decrease exposure to equity (down to a minimum amount), to help reduce losses in the portfolio from further market drops. If the withdrawal rate decreases, the RIMS application will increase exposure to equity assets (up to a maximum amount) to potentially capture future capital appreciation. Since the withdrawal rate of all investors will change based on market movements, the RIMS application shifts asset allocation in response to changes in the withdrawal rate even though it is not explicitly managing portfolios based on the unique circumstances of a particular investor.

Adaptive Investing Methodology

An adaptive investing methodology is an asset allocation methodology that provides asset allocations among two or more asset classes over a number of periods. By way of a non-limiting example, each period may be one year long. However, this is not a requirement and periods having other durations, such as one month, three months, and the like, may be used. Further, periods having identical, substantially identical, and non-uniform durations may also be used.

The asset allocations are not determined for a particular investor. Instead, a set of wealth tables (described below) are generated that specify asset allocations. These tables may be used to determine asset allocations for a particular investor.

The asset allocations (in the set of wealth tables) vary based on a set of predetermined investor variables. In other words, the values of the investor variables may be used to lookup the asset allocation for the current period (or other periods) for a particular investor. By way of a non-limiting example, the predetermined investor variables may include one or more of the following:
1. an investor's age (which may be used to determine an amount of time until retirement);
2. an investor's current contribution or savings rate;
3. an investor's current income;
4. an investor's account balance; and
5. optionally, an investor's level of risk tolerance.

In some embodiments, the predetermined investor variables include an investor's withdrawal rate or anticipated retirement spending during retirement.

As mentioned above, the asset allocations may be defined or specified in a set of wealth tables (described below) that includes one or more wealth tables. Thus, the set of wealth tables may be used to determine an asset allocation for a particular period based on the values of the investor variables. The set of wealth tables may be implemented as a data structure storing a multi-dimensional look up table. The look up table may include a dimension for each of the predetermined investor variables. The set of wealth tables may be implemented in a relational database. The set of wealth tables residing in the relational database may be queried using specific values for the predetermined investor variables to obtain an asset allocation for those values.

An adaptive investing methodology may be characterized as having three components: (1) a model, (2) a set of assumptions, and (3) the set of wealth tables. The model is a computer-implemented asset allocation model. The set of assumptions is used to calibrate the model and make sensible projections related to the retirement income needs of investors. The set of wealth tables is obtained from (or generated by) the model. As mentioned above, for each of a plurality of periods, the set of wealth tables maps the values of the investor variables to an allocation between two or more asset classes. By way of a non-limiting example, the asset classes may include a broadly defined growth asset class (which includes equities and other high return and high-risk assets) and a broadly defined capital preservation asset class (which includes fixed income assets). However, this is not a requirement and embodiments in which the asset classes include cash equivalents (e.g., money market instruments), real estate, and/or commodities are within the scope of the present teachings.

Exemplary implementations of each of the three components of the adaptive investing methodology are described in the following sections.

Model

As mentioned above, the model is used to generate the set of wealth tables based at least in part on the set of assumptions. The model may also include assumptions other than those included in the set of assumptions described below.

Figure 9:
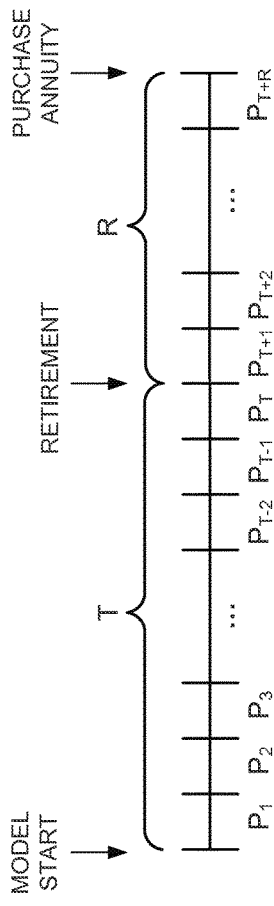
FIG. 9 is a timeline illustrating durations of time used by a model implementing at least a portion of an adaptive investing methodology.

Referring to FIG. 9, the model includes multiple periods (e.g., periods "$P_1$" to "$P_{T+R}$"), which extend from the present (e.g., the start of the period "$P_1$") and end on a date (e.g., the end of the period "$P_{T+R}$") at which an annuity is purchased. The annuity purchased may be an immediate life annuity. However, this is not a requirement. For example, the model may assume that a predetermined amount of wealth is required or that a financial asset other than an annuity (e.g., a bond) is purchased at the end of the period "$P_{T+R}$."

The model does not generate the set of wealth tables for any particular investor. Therefore, the model does not use any actual data related to one or more investors when generating the set of wealth tables. Instead, the model generates the set of wealth tables based on model parameters. By way of a non-limiting example, the model may be described with respect to the following four model parameters, which may vary between investors:
1. a first duration of time "T" (measured in periods in FIG. 9) that starts at the present (labeled "MODEL START") and ends at a future date (labeled "RETIREMENT"), during which money is contributed to an investment account;
2. a second duration of time "R" (measured in periods in FIG. 9) that starts at the end of the first duration of time "T" (labeled "RETIREMENT") and ends at a future date (labeled "PURCHASE ANNUITY") during which money is withdrawn from the investment account;
3. an amount to be invested each period during the first duration of time "T;" and
4. an amount to be withdrawn each period during the second duration of time "R."

In FIG. 9, the first duration of time "T" starts at the beginning of the period "$P_1$," which is also labeled "MODEL START" and ends at the end of the period "$P_T$," which is also labeled "RETIREMENT." The second duration of time "R" starts at the beginning of the period "$P_{T+1}$," which is also labeled "RETIREMENT" and ends at the end of the period "$P_{T+R}$," which is also labeled "PURCHASE ANNUITY."

The model may also include the following parameters, which do not vary between investors, and may be expressed in the model as stochastic variables:
1. rates of return for assets;
2. rate of inflation; and
3. real interest rate.

The model assumes a non-negative amount is invested into the investment account for each of the periods "$P_1$" to "$P_T$" during the first duration of time "T." These savings are adjusted for inflation (using the rate of inflation), and the amount saved for each of the periods "$P_1$" to "$P_T$" is expressed in current dollars.

In the model, the amounts saved for the periods "$P_1$" to "$P_T$" in the investment account are invested in a portfolio that includes assets belonging to a predetermined number of asset classes (e.g., one, two, three, four, five, etc.). By way of a non-limiting example, the asset classes may include a growth asset class, and a capital preservation asset class. Depending upon the implementation details, the savings may be invested in a single growth asset and a single capital preservation asset. However, this is not a requirement.

As mentioned above, the real rates of return of the assets are each stochastic. In the model, the real rates of return of the assets are represented by stochastic variables having a joint probability distribution. Methods of modeling rates of returns for assets are well known in the art and will not be described in At the end of the period "$P_T$," the model assumes contributions to the investment account terminate. In other words, the model assumes the investor stops saving money in the investment account at the end of the period "$P_T$." In some implementations, during the second duration of time "R," at least a portion of the funds are withdrawn from the investment account. Withdrawals may occur each period during the second duration of time "R" and terminate at the end of a period "$P_{T+R}$." However, in some embodiments, no savings or withdrawals may occur during the second duration of time "R" to protect the principal stored in the investment account while the investor transitions to the decumulation phase. Alternatively, the model may assume withdrawals commence at some point during the second duration of time "R."

At the end of the period "$P_{T+R}$," the model assumes an annuity (e.g., an immediate life annuity) is purchased using all or a portion of the funds remaining in the investment account (after the sale of all or a portion of the assets remaining in the portfolio). Thus, the final withdrawal from the investment account may occur at the end of the period "$P_{T+R}$." Purchasing the annuity gives the model a sensible specification that takes into account the fact that the duration of an investor's lifetime is unknown, and at the same time, allows the model to use a fixed duration of time (e.g., the sum of the first and second durations of time "T" and "R").

As is apparent to those of ordinary skill in the art, the purchase price of the annuity is determined at least in part by an investor's age and the prevailing real interest rate. Therefore, the model may use a predetermined investor age (e.g., 85-years-old) when determining the purchase price of the annuity. The real interest rate is stochastic. As mentioned above, in the model, the real rates of return of the assets are represented by stochastic variables having a joint probability distribution. The real interest rate may also be represented by a stochastic variable having a joint probability distribution with the real rates of return of the assets. Methods of modeling rates of returns for assets and the real interest rate using joint probability distributions are well known in the art and will not be described in further detail.

At the beginning of the period "$P_1$," the model assumes a current income. The model also determines an income for each period. The income for the period "$P_T$" is a final working income. If the first duration of time "T" includes only a single period, the period "$P_1$" is the same as the period "$P_T$," and the current income is equal to the final working income.

The model may be constructed such that the model parameters that represent monetary values are expressed in terms of the current income. For example, the amount to be invested each period during the first duration of time "T," the amount to be withdrawn each period during the second duration of time "R," and the current account balance at the beginning of the period "$P_1$" may all be expressed as a function (or multiple) of the current income.

The model generates one or more wealth tables for each unique pair of values of (1) the amount to be invested each period during the first duration of time "T," and (2) the amount to be withdrawn each period during the second duration of time "R." For example, FIG. 10 illustrates the asset allocations determined for a selected amount to be invested each period during the first duration of time "T" (e.g., 10% of the current income) and a selected amount to be withdrawn each period during the second duration of time "R" (e.g., 50% of the final working income). Each of the contoured lines (labeled "24 periods," "26 periods," "28 periods," "30 periods," "32 periods," "34 periods," "36 periods," and "38 periods") illustrates an asset allocation for a different value of the first duration of time "T." The y-axis is a percentage of the investment account that should be invested in equities (e.g., the growth asset class). The x-axis is a ratio of the current account balance to the current income.

In an alternative embodiment, the model may generate one or more wealth tables for each unique combination of values of the amount to be invested each period during the first duration of time "T," the amount to be withdrawn each period during the second duration of time "R," and a risk tolerance parameter. The risk tolerance parameter may have different values that reflect a level of risk tolerance. Depending upon the implementation details, a lower value may be used to indicate the investor is less willing to take risk and has a lower level of risk tolerance.

Figure 11:
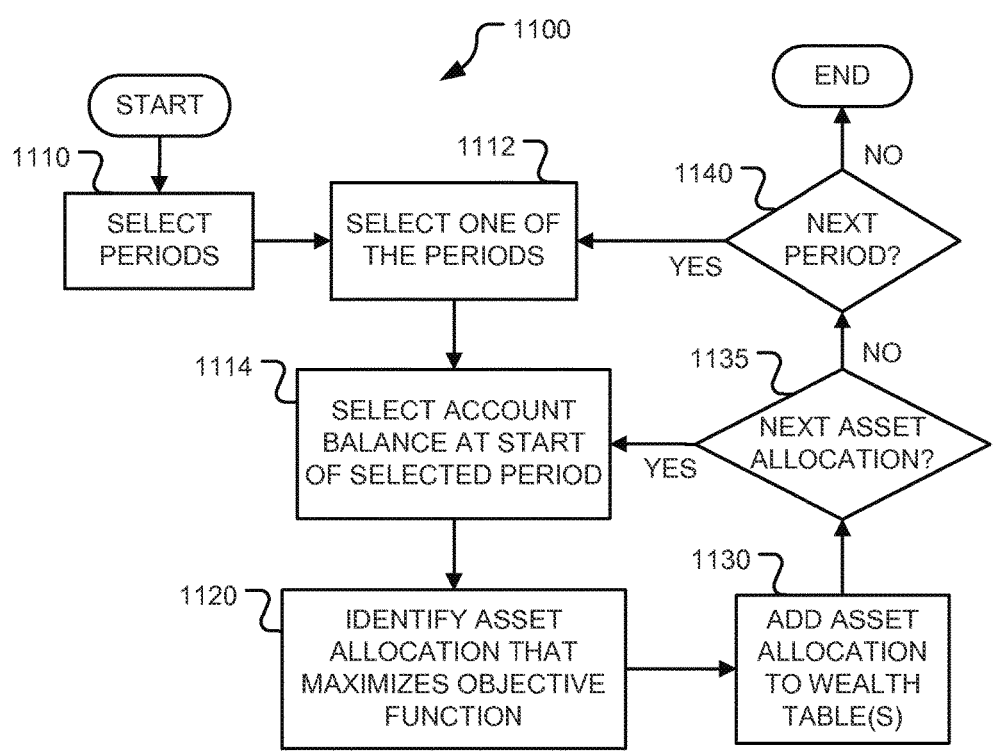
FIG. 11 is a flow diagram of a method of generating a set of wealth tables performed by the model.

FIG. 11 is a flow diagram of a method 1100 performed by the computer-implemented model. In first block 1110, the model selects a number of periods. For example, in block 1110, the model may select the periods "$P_1$" to "$P_T$" of the first duration of time "T." By way of another non-limiting example, in block 1110, the model may select the periods "$P_1$" to "$P_{T+R}$" of the first and second durations of time "T" and "R."

In block 1112, the model selects one of the periods. In this example, the model selects the last period (e.g., the period "$P_T$" when the periods "$P_1$" to "$P_T$" of the first duration of time "T" were selected in block 1110, the period "$P_{T+R}$" when the periods "$P_1$" to "$P_{T+R}$" of the first and second durations of time "T" and "R" were selected in block 1110, and the like).

In block 1114, the model selects a starting account balance at the start of the period selected in block 1112. The starting account balance selected is non-negative. In this example, any contribution to be made to the investment account during the selected period is made at the start of the selected period. Similarly, any withdrawal to be made from the investment account during the selected period is made at the end of the selected period. In alternate embodiments, any withdrawal to be made from the investment account during the selected period may be made at the start of the selected period. Thus, the only change to the account balance that may occur during the selected period is the result of income generated or loss incurred by the investment of the funds in the investment account.

In block 1120, the model identifies an asset allocation for the period selected in block 1112 (and the starting account balance selected in block 1114) that optimizes an objective function. In this example, the objective function is the expected value of annuitized income from the annuity purchased at the end of the period "$P_{T+R}$" minus a value determined by a "shortfall" risk function. Because an investor's lifetime is unknown, the expected value of the annuitized income from the annuity may be the expected value of a predetermined number of payments to be made by the annuity. Methods of calculating an expected value of annuitized income from an annuity purchased at a future date are known to those of ordinary skill in the art and will not be described in detail.

The value of the "shortfall" risk function is the product of the risk tolerance parameter and the square of a shortfall. As mentioned above, the risk tolerance parameter may be a constant or fixed value. A risk averse investor may wish to use asset allocations determined using a smaller value for the risk tolerance parameter to increase the size of the shortfall.

Shortfall is the greater of (a) zero or (b) the purchase price of the annuity minus the account balance at the end of the period "$P_{T+R}$." In such embodiments, the predetermined investor age (e.g., 85-years-old) at the end of period "$P_{T+R}$" is used to calculate the purchase price of the annuity used in the shortfall measure. The predetermined investor age may be determined by adding the second duration of time "R" measured in years (e.g., 20 years) to a predetermined retirement age also measured in years (e.g., 65-years-old). The purchase price of the annuity may also depend at least in part on the investor's gender. Therefore, the model may use gender-specific mortality tables when calculating the purchase price. In such an embodiment, different wealth tables may be generated for men and women. Alternatively, the model may use unisex mortality tables when calculating the purchase price. Methods of calculating or otherwise determining the purchase price of the annuity are known to those of ordinary skill in the art and will not be described in detail.

Thus, the goal of the objective function is to maximize the account balance at the end of the period "$P_{T+R}$" without too much exposure to the risk that the account balance will be less than the purchase price of the annuity.

The account balance at the end of the period "$P_{T+R}$" may have been evaluated (e.g., optimized) using 5,000 market scenarios. For example, a Monte Carlo Simulation ("MCS") process may be used to determine the projected wealth by generating five thousand possible scenarios for portfolio returns. MCS analysis is based on broad asset class return assumptions and well-diversified portfolios. For example, all modeling may be before taxes and without regard to holding periods and transaction costs. Annual rebalancing of the portfolio is assumed. Internal Revenue Service minimum required distribution rules that may be applicable for tax-deferred accounts are not considered. Withdrawals are assumed to be made on a pro-rata basis from the asset classes comprising the portfolio.

The asset class forecasts considered in the model may be based on the assumptions listed in Table 4 below:

TABLE 4

| | Projected Returns | |
| --- | --- | --- |
| | Equity | Fixed Income |
| Expected Return | 8.22% | 5.04% |
| Standard Deviation | 18.34% | 5.52% |
| Correlations | | |
| Equity | 1 | — |
| Fixed Income | 0.325 | 1 |

In block 1130, the model updates the set of wealth tables to include the asset allocation identified in block 1120.

In decision block 1135, the model determines whether an asset allocation is to be identified for another starting account balance. The decision in decision block 1135 is "YES" when an asset allocation is to be identified for another starting account balance. On the other hand, the decision in decision block 1135 is "NO" when an asset allocation is not to be identified for another starting account balance. By way of a non-limiting example, the model may include a set of predetermined (non-negative) starting account balances. In this example, the decision in decision block 1135 is "YES" until all of the starting account balances in the set have been selected. When all of the starting account balances in the set have been selected, the decision in decision block 1135 is "NO."

When the decision in decision block 1135 is "YES," the model advances to block 1114 to select another starting account balance.

By repeating the blocks 1114, 1120, 1130, and 1135, the model generates a portion of the wealth table(s) for the period selected in block 1112. This portion of the wealth table(s) depicts a first relationship between the starting account balances at the start of the selected period and the asset allocations identified in block 1120.

When the decision in decision block 1135 is "NO," the model advances to decision block 1140 to determine whether to select another period. In embodiments in which the last period of the periods selected in block 1110 was selected the first time block 1112 was performed, the decision in decision block 1140 is "YES" when a previously unselected period precedes the period selected in block 1112. On the other hand, the decision in decision block 1140 is "NO" when a previously unselected period does not precede the period selected in block 1112.

When the decision in decision block 1140 is "NO," the method 1100 terminates.

When the decision in decision block 1140 is "YES," in block 1112, the model selects the period preceding the period selected the last time block 1112 was performed. In this manner, by repeating block 1112, the method 1100 selects each of the periods selected in block 1110 from last to first.

By repeating blocks 1114, 1120, 1130, and 1135, the model defines a second relationship between the starting account balances at the start of each period and the values of the objective function at the end of the set of periods selected in block 1110. For each period (except the last period), the model generates ending account balances at the end of the period that may be used as starting account balances at the start of the next (or subsequent) period. Further, each of the ending account balances at the end of the period (which is also a starting account balance for a subsequent period) is associated with a value of the objective function at the end of the periods selected in block 1110.

For example, if the current period is the period "$P_{T-1}$" (i.e., the period "$P_{T-1}$" was selected in block 1112), the subsequent period is the period "$P_T$" (i.e., the period "$P_T$" was selected previously in block 1112). In this example, the period "$P_T$" is the last period in the set of periods selected in block 1110. In blocks 1114, 1120, 1130, and 1135, the model determines asset allocations for a set of starting account balances at the start of the current period "$P_{T-1}$." The model also determines a set of ending account balances at the end of the current period "$P_{T-1}$." The model previously determined asset allocations for a set of starting account balances at the start of the subsequent period "$P_T$" as well as the value of the objective function for each starting account balance at the end of the last period. In block 1120, the model may determine the value of the objective function for each starting account balance of the current period "$P_{T-1}$" by matching the ending account balances of the current period "$P_{T-1}$" with the starting account balances of the subsequent period "$P_T$." This process is repeated for each period in the set of periods selected in block 1110. In this manner, for each of the set of starting account balances at the start of each period except the first period "$P_1$," the model may readily determine the value of the objective function at the end of the last period of the periods selected in block 1110. Thus, for a predetermined starting account balance at the start of the first period "$P_1$" (e.g., zero or a non-negative value), the model may readily determine the value of the objective function at the end of the last period of the periods selected in block 1110. As mentioned above, for each period, the model selects the asset allocation that maximizes the value of the objective function. Therefore, the second relationship may be used in block 1120 to select an asset allocation for each of the periods (except the last period).

The wealth table(s) populated in block 1130 may be expressed in terms of the investor variables so that the asset allocation for each period may be looked up in the set of wealth tables using the values of the investor variables. Therefore, in block 1130, the asset allocations may be expressed in the set of wealth tables as a function of the values of the investor variables. The set of assumptions described below may be used to map the model parameters to the predetermined investor variables.

By way of a non-limiting example, the set of starting account balances may range from zero to a value large enough to encompass most investors (e.g., ten million dollars). For the periods "$P_1$" to "$P_T$" of the first duration of time "T," the set may include a starting account balance equal to each of a plurality of amounts to be invested each period during the first duration of time "T."

For the amount to be invested each period during the first duration of time "T," the model may use a starting value and a predetermined function to adjust (e.g., increase) the starting value over time. For example, the predetermined function may increase the starting value based on estimated increases in the cost of living and/or estimated changes in the investor's income. By way of non-limiting example, the model may assume the starting value will increase by a predetermined rate each year.

For the amount to be withdrawn each period during the second duration of time "R," the model may use a starting value and a predetermined function to adjust (e.g., increase) the starting value over time. For example, the predetermined function may increase the starting value based on estimated increases in the cost of living and/or estimated changes in the investor's lifestyle.

In some embodiments, the model may be used to model only the periods "$P_{T+1}$" to "$P_{T+R}$" of the second duration of time "R" (e.g., for investors who have already retired). In such embodiments, a predetermined starting account balance at the start of the period "$P_{T+1}$" may be used as an initial retirement income and a portion of the initial retirement income may be selected as the amount to be withdrawn each period during the second duration of time "R."

Assumptions

As mentioned above, the set of wealth tables are used to determine asset allocations for one or more investors. However, the set of wealth tables were not created specifically for any particular investor. Instead, the set of wealth tables were generated based on predetermined values of the model parameters. The set of assumptions map the model parameters to the predetermined investor variables. Thus, the following assumptions may be used to look up (or query) the asset allocations in the set of wealth tables generated by the method 1100 described above.

For all investors, the second duration of time "R" (measured in years) may be assumed to be a predetermined number of years (e.g., 20 years). Further, the first duration of time "T" (measured in years) may be determined using a predetermined retirement age (e.g., 65-years-old) and the investor's age. Thus, values for the first and second durations of time "T" and "R" may be determined for each investor. For example, using these assumptions, a 45-year-old investor will retire in 20 years (i.e., the first duration of time "T"=20 years) and will make withdrawals from the investment account until age 85. At age 85, the model assumes the investor purchases an annuity. The investor's age may be provided by the record keeper.

The amount to be invested each period during the first duration of time "T" may be determined based on the investor's current income and the savings rate. In other words, for each period during the first duration of time "T," the model assumes the investor saves a proportion (indicated by the savings rate) of the investor's income during the period (calculated based on the investor's current income). The savings rate may be fixed (e.g., 10%). However, this is not a requirement. The model may assume the investor's real (inflation-adjusted) income will grow at a predetermined rate (usually 1.5% per year for an investor based in the U.S.) each period from the investor's current income. In this manner, the investor's income may be determined for each period within the first duration of time "T." Further, the investor's final working income (i.e., the investor's income during the period "$P_T$") may also be determined. The investor's current income and the savings rate may be provided by the record keeper. For example, the record keeper typically knows the portion of the investor's current income being invested in the account and the amount invested. Using this information, the record keeper may calculate the investor's current income.

The amount to be withdrawn each period during the second duration of time "R," may be determined using an investor's anticipated retirement spending. The investor's anticipated retirement spending may be estimated in the same manner that the amount to be withdrawn each period during the second duration of time "R" was estimated by the model. In other words, the investor's anticipated retirement spending may be estimated as a percentage of the investor's final working income (i.e., the investor's income during the period "$P_T$"), which as described above may be estimated from the investor's current income. For example, it may be assumed that the investor's real (inflation-adjusted) income will grow at a predetermined rate (usually 1.5% per year for an investor based in the U.S.) each period from the investor's current income. The percentage of the investor's final working income to be withdrawn from the investment account during the second duration of time "R" may be obtained from the "Replacement Ratio Study" available from AON Corporation of Chicago, Ill., or a similar income replacement information source may be used to help determine the percentage. Based on such information, it is believed the percentage will be less than one hundred percent. The amount to be withdrawn each period may be selected to be large enough to maintain the investor's pre-retirement standard of living. Further, since the percentage of the investor's final working income needed to maintain the pre-retirement standard of living depends on income level, the investor's current income may be used to help specify the percentage. By way of another non-limiting example, a predetermined percentage may be used.

The investor's current account balance may be provided by the record keeper and is mapped directly to the current account balance used by the model and included in the set of wealth tables. The current account balance may include all sources of the investor's money stored by the one or more computing devices 170 operated by a record keeper. Such sources may include but are not limited to rollover accounts, employer accounts, pre-tax employee accounts, post-tax employee accounts, and the like.

Optionally, the investor may provide the record keeper with a value to be used for the risk tolerance parameter. Alternatively, a predetermined fixed value may be used for all investors.

The set of assumptions described above that map the model parameters to the predetermined investor variables help reduce the amount of information needed to use the set of wealth tables. However, the predetermined investor variables may include one or more variables other than those described above, which can also be used as parameters in the model. For example, information about assets outside the portfolio purchased by the investment account as well as other sources of retirement income (e.g., Social Security) can be incorporated into the objective function to give a more holistic strategy for an investor.

In addition to the assumptions described above, the model may also include assumptions related to rates of return and yields for the asset classes. However, as mentioned above, methods of modeling the rates of return for assets, the rate of inflation, and the real interest rate are known in the art and will not be described in further detail herein.

Set of Wealth Tables

The set of wealth tables may be used to obtain asset allocations for one or more sets of values of the predetermined investor variables. Interpolation and similar techniques may be used to obtain the asset allocations for sets of values of the predetermined investor variables that do not map directly to the model parameters used to generate the asset allocations stored in the set of wealth tables.

The set of wealth tables may be delivered to a recipient (e.g., an investor, the record keeper, an investment advisor, and the like) as electronically stored lookup tables. Alternatively, the set of wealth tables may be delivered to a recipient in printed form. The set of wealth tables may be delivered to a recipient (e.g., the record keeper) as one or more data files that can be stored by the recipient in a database, which may be integrated in the recipient's system. For example, the set of wealth tables may be received by the computing device 110 of the system 100 illustrated in FIG. 1 and used by the RIMS application as described above.

The set of wealth tables may be updated or revised occasionally (e.g., periodically) to reflect changes in the assumptions of the model. The recipient of the set of wealth tables may adjust the asset allocations in one or more investors' portfolios occasionally (e.g., periodically) based on the asset allocations stored in the set of wealth tables. For example, the recipient may adjust the asset allocations in the one or more investors' portfolios quarterly. The adjustment for a particular investor may reflect changes in the values of the investor's variables as well as revisions made to the set of wealth tables.

The set of wealth tables contain all of the information needed by the recipient to implement an investment strategy. Therefore, the recipient does not require access to the model and may avoid costs associated with maintaining and running the model.

System

FIG. 1 illustrates the exemplary system 150 that may be used to implement an adaptive investing methodology. The system 150 includes one or more computing devices 160 operated by a modeling entity, one or more computing devices 170 operated by a record keeper, and optionally, one or more computing devices 180 operated by one or more recipients of the set of wealth tables generated by the model. The one or more recipients may include an investor, an investment advisor, a record keeper, a plan manager (e.g., of a defined contribution pension plan), or other party wishing to determine an asset allocation for the current period. For example, the retirement planning entity (discussed above) may be a recipient of the set of wealth tables generated by the model.

In the embodiment illustrated, the computing devices 170 and 180 are connected to one another by the network 190 (e.g., the Internet). The one or more recipients may receive information from the record keeper via the network 190. For example, the one or more recipients may receive the values of the investor variables for one or more investors from the one or more computing devices 170 over the network 190. In such embodiments, the one or more computing devices 180 store or otherwise have access to the set of wealth tables. For each of the one or more investors, the one or more computing devices 180 look up the values of the investor variables for the investor in the set of wealth tables to obtain the asset allocation for the current period. Then, for each investor, if the asset allocation for the current period differs significantly from the current asset allocation, the recipient may change the asset allocation in the investor's portfolio.

The computing devices 160 and 180 are connected to one another by the network 190 (e.g., the Internet). The one or more computing devices 160 may send the set of wealth tables to the one or more computing devices 180 over the network 190. Alternatively, the one or more computing devices 160 may store the set of wealth tables on one or more non-transitory computer-readable mediums and send the one or more non-transitory computer-readable mediums to the one or more recipients.

The computing devices 160 and 110 are connected to one another by the network 190 (e.g., the Internet). The one or more computing devices 160 may send the set of wealth tables to the computing device 110 over the network 190. Alternatively, the computing device 110 may receive information from the set of wealth tables by communicating via the network 190 with one of the one or more computing devices 180.

In the embodiment of the system 150 illustrated in FIG. 1, the computing devices 160 and 170 are connected to one another by the network 190. Optionally, the one or more computing devices 170 may send information (e.g., the values of the investor variables for the one or more investors) to the one or more computing devices 160 for the purposes of configuring the model.

In some embodiments, the record keeper operating the one or more computing devices 170 is the recipient of the set of wealth tables generated by the model. In such embodiments, the one or more computing devices 180 may be omitted from the system 150. The one or more computing devices 160 may send the set of wealth tables to the one or more computing devices 170 over the network 190. Alternatively, the one or more computing devices 160 may store the set of wealth tables on one or more non-transitory computer-readable mediums and send the one or more non-transitory computer-readable mediums to the record keeper. Thus, the one or more computing devices 170 may store or otherwise have access to the set of wealth tables. For each of one or more investors, the one or more computing devices 170 look up the values of the investor variables for the investor in the set of wealth tables to obtain the asset allocation for the current period. Then, for each investor, if the asset allocation for the current period differs significantly from the current asset allocation, the record keeper may change the asset allocation in the investor's portfolio.

In some embodiments, the modeling entity may use the set of wealth tables in the same manner described with respect to the record keeper and/or the recipient. In such embodiments, the one or more computing devices 160 may not send the set of wealth tables to either the one or more computing devices 170 or the one or more computing devices 180. In such embodiments, the one or more computing devices 180 may be omitted from the system 150. The modeling entity may receive information from the record keeper via the network 190. For example, the modeling entity may receive the values of the investor variables for one or more investors from the one or more computing devices 170 over the network 190. Alternatively, the modeling entity may have the values of the investor variables for one or more investors. In such embodiments, the one or more computing devices 170 may be omitted from the system 150. For each of one or more investors, the one or more computing devices 160 look up the values of the investor variables for the investor in the set of wealth tables to obtain the asset allocation for the current period. Then, for each investor, if the asset allocation for the current period differs significantly from the current asset allocation, the modeling entity may change the asset allocation in the investor's portfolio.

Figure 12:
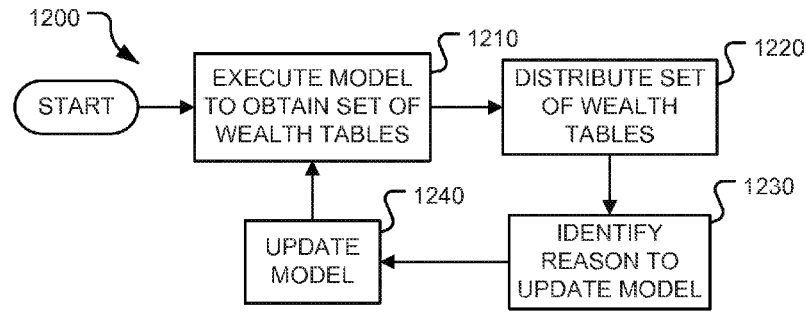
FIG. 12 is a flow diagram of a method performed by a modeling entity of the system of FIG. 1.

FIG. 12 is a flow diagram of a method 1200 performed by the modeling entity. In first block 1210, the modeling entity configures and executes the model to obtain the set of wealth tables. By way of a non-limiting example, in block 1210, the modeling entity may perform the method 1100 (see FIG. 11). Then, in block 1220, the modeling entity distributes the set of wealth tables to the record keeper and/or one or more recipients (e.g., an investor, an investment advisor, a combination thereof, and the like). In block 1230, the modeling entity identifies one or more reasons to update the model. Examples of reasons to update the model may include one or more of the following: changes have occurred in the forecasted returns of the asset classes; changes have occurred in mortality tables used to price the annuity (e.g., an immediate life annuity); and new asset classes have been introduced and made available for the investment fund.

In block 1240, the modeling entity updates the model. Then, the modeling entity returns to block 1210 to re-execute the model.

While in method 1200, the modeling entity distributes the set of wealth tables to the record keeper and/or one or more recipients. In alternate embodiments, instead of distributing the set of wealth tables, the modeling entity may use the set of wealth tables in the same manner described with respect to the recipient. In such alternate embodiments, block 1220 may be omitted from the method 1200.

Figure 13:
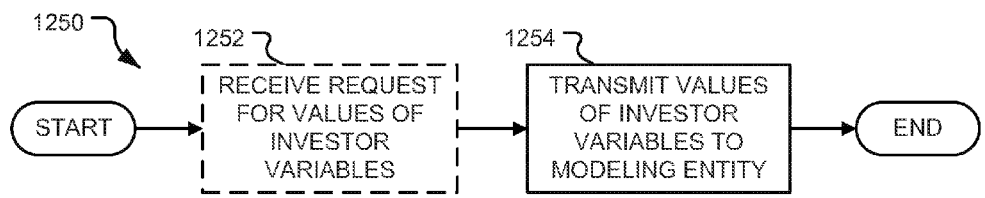
FIG. 13 is a flow diagram of a method performed by a record keeper of the system of FIG. 1.

FIG. 13 is a flow diagram of a method 1250 performed by the record keeper. In an optional first block 1252, the record keeper may receive a request for the values of the investor variables for one or more investors. In block 1254, the record keeper transmits the values of the investor variables for one or more investors to the modeling entity. In embodiments omitting the optional block 1252, the record keeper may send the values of the investor variables for one or more investors to the modeling entity occasionally (e.g., periodically). Then, the method 1250 terminates.

Figure 14:
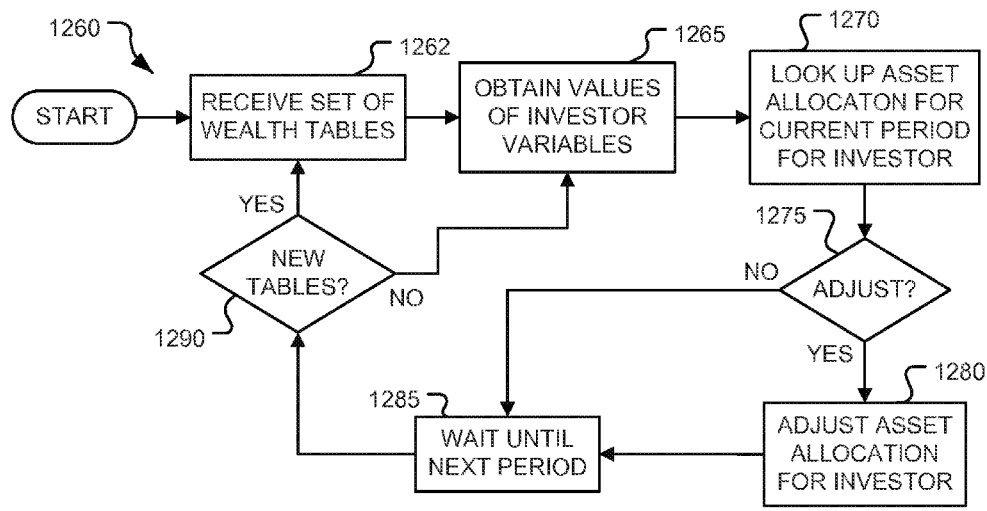
FIG. 14 is a flow diagram of a method that may be performed by one or more recipients of a set of wealth tables generated by the model.

FIG. 14 is a flow diagram of a method 1260 that may be performed by each of the one or more recipients and/or the record keeper. For ease of illustration, the method 1260 will be described as being performed by a selected one of the recipients. In first block 1262, the recipient receives the set of wealth tables from the modeling entity. In block 1265, the recipient obtains values for the investor variables for one or more investors from the record keeper. Optionally, in block 1265, the recipient may send a request to the record keeper requesting the values of the investor variables for the one or more investors and receive the values of the investor variables for the one or more investors from the record keeper in response to the request. Alternatively, the modeling entity may receive the values of the investor variables for the one or more investors from the record keeper occasionally (e.g., periodically). In block 1270, for each of the one or more investors, the recipient looks up the values of the investor variables for the investor in the set of wealth tables to obtain the asset allocation for the current period.

In decision block 1275, for each of the one or more investors, the recipient determines whether the asset allocation obtained for the current period differs significantly from the current asset allocation of the investor's portfolio (purchased using funds in the investment account) such that the asset allocation in the investor's portfolio should be modified. The decision in decision block 1275 is "YES" when the recipient determines the asset allocation obtained for the current period differs significantly from the current asset allocation of the investor's portfolio. On the other hand, the decision in decision block 1275 is "NO" when the recipient determines the asset allocation obtained for the current period does not differ significantly from the current asset allocation of the investor's portfolio.

When the decision in decision block 1275 is "YES," in block 1280, the recipient modifies the asset allocations in the investor's portfolio. Then, the recipient advances to block 1285 to wait until the next period.

When the decision in decision block 1275 is "NO," in block 1285, the recipient waits until the next period.

Then, in decision block 1290, the recipient determines whether a new set of wealth tables is available. The decision in decision block 1290 is "YES" when a new set of wealth tables is available. When the decision in decision block 1290 is "YES," the recipient returns to block 1262. On the other hand, the decision in decision block 1290 is "NO" when a new set of wealth tables is not available. When the decision in decision block 1290 is "NO," the recipient returns to block 1265.

The asset allocations provided by an adaptive investing methodology may be used as an alternative investment strategy to target date funds and managed accounts. For example, the asset allocations may be used by a defined contribution pension plan to determine asset allocations for each participant. By way of another non-limiting example, the asset allocations may be used as an allocation model to fund the anticipated retirement spending for an individual. Further, an adaptive investing methodology may be used as a lifetime investment planning tool that provides asset allocations over an investor's working and retired life.

A defined contribution record keeper or an investment advisor may fully implement the adaptive investing methodology using only the set of wealth tables and need not maintain or directly use the model. This feature may help reduce implementation costs.

By way of yet another non-limiting example, the adaptive investing methodology may be implemented as a software program executed by investment advisors. In such an implementation, an investment advisor may collect the values of the investor variables and input those values into the software program.

Computing Device

Figure 15:
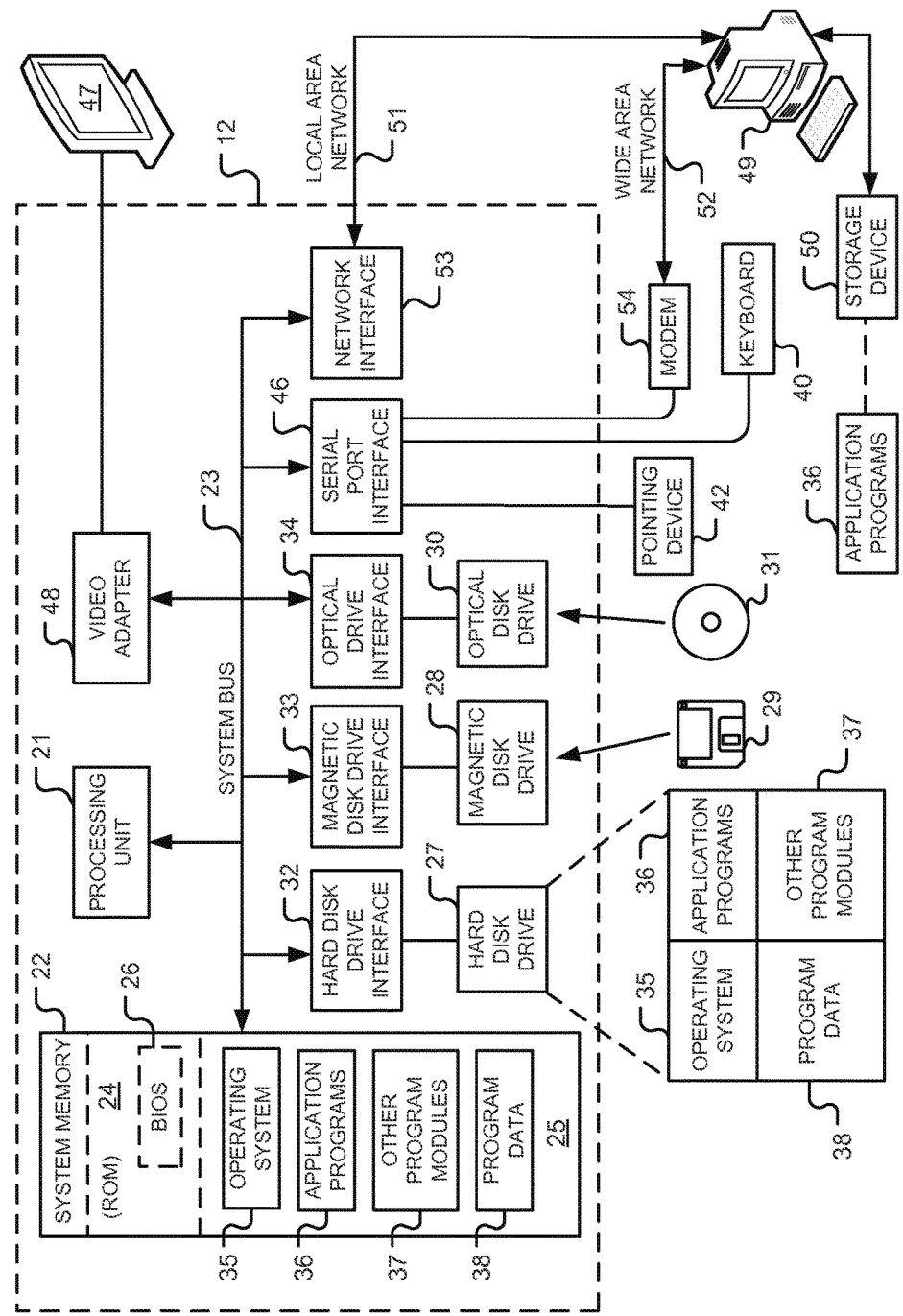
FIG. 15 is a diagram of a hardware environment and an operating environment in which one or more of the computing devices of the systems of FIG. 1 may be implemented.

FIG. 15 is a diagram of hardware and an operating environment in conjunction with which implementations of the model and set of wealth tables may be practiced. The description of FIG. 15 is intended to provide a brief, general description of suitable computer hardware and a suitable computing environment in which implementations may be practiced. Such implementations include computer-executable instructions, such as program modules, executed by a computing device, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 15 includes a general-purpose computing device in the form of a computing device 12. Referring to FIG. 1, the computing device 110, the computing device 120A, and the computing device 120B, the one or more computing devices 160, the one or more computing devices 170, and the one or more computing devices 180 may each be implemented using a computing device substantially similar to the computing device 12.

Returning to FIG. 15, the computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface. The input devices may be used to receive information from the advisor, the investor, the retirement planning entity, the modeling entity, the record keeper, and/or the investment advisor. The user interface may be used to display the asset allocations, the asset allocation for the current period, at least a portion of the set of wealth tables, and the like.

The user interface may be used to display the screens 270, 280, 690, 695, and 698 illustrated in FIGS. 2B, 2C, 6C, 8A, and 6D, respectively.

With respect to the method 200 illustrated in FIG. 2A, the user interface may be used to enter the user input received in block 210, and to display or print the funded ratio and/or surplus value in block 260 of the method 200.

With respect to the method 500 illustrated in FIG. 5, the user interface may be used to enter an adjustment to the investor's retirement plan in block 570, an indication as to whether the user wishes to adjust the investor's retirement plan in decision block 560, and/or an indication as to whether the user wishes to perform the method 600 in optional block 524.

With respect to the method 600 illustrated in FIG. 6A, the user interface may be used to indicate selections in block 620 and the optional block 680 of the method 600. Further, the user interface may be used to indicate whether the user wishes to analyze one or more additional investment strategy in decision block 660 of the method 600. The user interface may be used to indicate whether the user wishes to select one of the investment strategies in decision block 670. The user interface may be used to display or print the results output in block 650 of the method 600 (see FIG. 6A) and/or the investment strategy details output in optional block 684 of the method 600. The user interface may be used to indicate whether the user wishes to implement the selected investment strategy in decision block 686.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 15 include a local-area network (LAN) 51 and a wide-area network (WAN) 52. Such networking environments are commonplace in offices, enterprise-wide computer networks, intranets and the Internet. The network 190 (see FIG. 1) may be implemented using at least a portion of the networked environment described above.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The memory of the computing device 110 operated by the retirement planning entity stores computer executable instructions that when executed by one or more processors cause the one or more processors to perform all or portions of the methods 200 (see FIG. 2A), 300 (see FIG. 3A), 400 (see FIG. 4), 500 (see FIG. 5), and 600 (see FIG. 6A). Such instructions may be stored on one or more non-transitory computer-readable media. Further, the memory of the computing device 110 operated by the retirement planning entity may store computer executable instructions that when executed by one or more processors implement the retirement lifestyle planner and/or the RIMS application. Such instructions may be stored on one or more non-transitory computer-readable media.

The memory of the one or more computing devices 160 operated by the modeling entity stores computer executable instructions that when executed by one or more processors cause the one or more processors to perform all or portions of the methods 1100 (see FIG. 11), 1200 (see FIG. 12) and 1260 (see FIG. 14). Such instructions may be stored on one or more non-transitory computer-readable media.

The memory of the one or more computing devices 170 operated by the record keeper stores processor executable instructions that when executed by one or more processors cause the one or more processors to perform all or portions of the methods 1250 (see FIG. 13) and 1260 (see FIG. 14). Such instructions may be stored on one or more non-transitory computer-readable media.

The memory of the one or more computing devices 180 operated by the one or more recipients of the set of wealth tables store processor executable instructions that when executed by one or more processors cause the one or more processors to perform all or portions of the method 1260 (see FIG. 14). Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer implemented method of displaying whether a retirement plan is at risk of being underfunded on a results graphical user interface, the method comprising:

receiving, by at least one server computing device, a first request from a requesting client computing device, the first request being received over a network connected to the requesting client computing device and the at least one server computing device;

transmitting, by the at least one server computing device, an input interface over the network to the requesting client computing device in response to the first request, the input interface being configured to receive information identifying an investor's assets and future liabilities;

receiving, by the at least one server computing device, the information identifying the investor's assets and future liabilities from the requesting client computing device over the network, the information having been entered into the input interface;

instructing, by the at least one server computing device, the requesting client computing device to display the results graphical user interface;

displaying, by the at least one server computing device, a net present value of the investor's assets on the results graphical user interface;

calculating, by the at least one server computing device, a net present value of the investor's future liabilities using a mortality table that includes a probability that the investor will live to each of a plurality of ages;

displaying, by the at least one server computing device, the net present value of the investor's future liabilities on the results graphical user interface;

calculating, by the at least one server computing device, a funded ratio by dividing the net present value of the investor's assets by the net present value of the investor's future liabilities;

displaying, by the at least one server computing device, a graphic representation of the funded ratio on the results graphical user interface, the graphic representation being color coded with a first, second, or third color, the first color indicating the investor's assets are likely to be adequate to pay the investor's future liabilities, the second color indicating a first risk that the investor's assets are inadequate to pay the investor's future liabilities, the third color indicating a second risk that the investor's assets are inadequate to pay the investor's future liabilities, the second risk being greater than the first risk, the first, second, and third colors being different from one another;

displaying, by the at least one server computing device, at least one user input on the results graphical user interface, the at least one user input allowing a user of the requesting client computing device to modify one or both of the investor's assets and the investor's future liabilities;

receiving, by the at least one server computing device, an indication from the requesting client computing device that the user has selected the at least one user input indicating the user would like to adjust one or both of the investor's assets and the investor's future liabilities;

transmitting, by the at least one server computing device, an adjustment interface to the requesting client computing device in response to the indication, the adjustment interface being configured to receive new information modifying one or both of the investor's assets and the investor's future liabilities;

when the new information modifies the investor's assets, the at least one server computing device determining a new net present value of the investor's assets, and replacing the net present value of the investor's assets with the new net present value of the investor's assets;

when the new information modifies the investor's future liabilities, the at least one server computing device determining a new net present value of the investor's future liabilities, and replacing the net present value of the investor's future liabilities with the new net present value of the investor's future liabilities;

calculating, by the at least one server computing device, a new funded ratio by dividing the net present value of the investor's assets by the net present value of the investor's future liabilities;

instructing, by the at least one server computing device, the requesting client computing device to display a new results graphical user interface;

displaying, by the at least one server computing device, the net present value of the investor's assets on the new results graphical user interface;

displaying, by the at least one server computing device, the net present value of the investor's future liabilities on the new results graphical user interface;

displaying, by the at least one server computing device, a new graphic representation of the new funded ratio on the new results graphical user interface, the new graphic representation being color coded with one of the first, second, or third colors; and displaying, by the at least one server computing device, the at least one user input on the new results graphical user interface.

2. The method of claim 1, further comprising:

receiving, by the at least one server computing device, an indication from the requesting client computing device that the user would like to evaluate one or more investment strategies;

transmitting, by the at least one server computing device, an investment strategy interface to the requesting client computing device in response to the indication, the investment strategy interface being configured to receive information identifying a first investment strategy and a second investment strategy;

determining, by the at least one server computing device, a first future value of the investor's assets at a future date, the first future value being a projected value of the investor's assets if invested according to the first investment strategy;

determining, by the at least one server computing device, a second future value of the investor's assets at the future date, the second future value being a projected value of the investor's assets if invested according to the second investment strategy;

determining, by the at least one server computing device, a threshold value based at least in part on the investor's future liabilities; and transmitting, by the at least one server computing device, an investment results interface to the requesting client computing device, the investment results interface displaying the first future value, the second future value, and the threshold value.

3. The method of claim 2, wherein the threshold value is a projected market price for an annuity to be purchased at the future date, the annuity being sufficient to pay a portion of the investor's future liabilities occurring after the future date.

4. The method of claim 2, wherein the threshold value is a projected actuarial net future value on the future date of a portion of the investor's future liabilities occurring after the future date.

5. The method of claim 2, further comprising:

receiving, by the at least one server computing device, a selection of one of the first and second investment strategies, the selected investment strategy comprising at least one asset allocation; and instructing, by the at least one server computing device, the requesting client computing device to display the at least one asset allocation of the selected investment strategy.

6. The method of claim 2, further comprising:

receiving, by the at least one server computing device, a selection of one of the first and second investment strategies, the selected investment strategy comprising an asset allocation, wherein the investor's assets comprise an investment portfolio and implementing the selected investment strategy comprises modifying the investment portfolio to match the asset allocation.

7. The method of claim 2, wherein the first investment strategy comprises an asset allocation determined based at least in part on the funded ratio.

8. The method of claim 7, wherein the first investment strategy allocates a first portion of the investor's assets to growth assets if the funded ratio is less than a first threshold value, and a second portion of the investor's assets to growth assets if the funded ratio is greater than a second threshold value, the second threshold value being larger than the first threshold value, and the second portion of the investor's assets being larger than the first portion of the investor's assets.

9. The method of claim 8, wherein the first investment strategy allocates a third portion of the investor's assets to growth assets if the funded ratio is greater than the first threshold value, and less than the second threshold value, the third portion of the investor's assets being less than the second portion of the investor's assets, and larger than the first portion of the investor's assets.

10. The method of claim 2, wherein the first investment strategy comprises an asset allocation determined based at least in part on an age of the investor, and a withdrawal rate for a period, the withdrawal rate being determined at least in part based on the net present value of the investor's assets and a portion of the investor's future liabilities occurring during the period.

11. The method of claim 10 for use with a set of wealth tables associating a plurality of withdrawal rates and investor ages with asset allocations, wherein the asset allocation of the first investment strategy for the period is determined by looking up the investor's age and the withdrawal rate in the set of wealth tables, and using, as the asset allocation of the first investment strategy, a looked up asset allocation associated with the investor's age and the withdrawal rate in the set of wealth tables.

12. The method of claim 1, further comprising:

determining, by the at least one server computing device, the investor's assets are likely to be adequate to pay the investor's future liabilities when the funded ratio is greater than a predetermined funded ratio threshold value, the predetermined funded ratio threshold value being greater than or equal to one.

13. The method of claim 1, further comprising:

determining, by the at least one server computing device, the investor's assets are at the second risk of being inadequate to pay the investor's future liabilities when the funded ratio is less than a predetermined significant risk threshold value, the predetermined significant risk threshold value being less than or equal to one.

14. The method of claim 1, wherein the investor's assets comprise a plurality of financial assets, and the method further comprises:

determining, by the at least one server computing device, the net present value of the investor's assets by determining a net present value of each of the plurality of financial assets to obtain a plurality of net present values for the financial assets, and totaling the plurality of net present values determined for the financial assets to obtain a total net present value of the financial assets.

15. The method of claim 14, wherein the investor's assets comprise human capital, and the net present value of the investor's assets is determined by determining a net present value of the human capital, and adding the net present value of the human capital to the total net present value of the financial assets.

16. The method of claim 15, wherein the human capital comprises future retirement contributions, and determining, by the at least one server computing device, the net present value of the human capital by totaling the future retirement contributions discounted at an appropriate interest rate.

17. The method of claim 1, wherein the net present value of the investor's future liabilities is a market price for an annuity with payouts sufficient to pay the investor's future liabilities.

18. The method of claim 1, wherein the net present value of the investor's future liabilities is an actuarial net present value of the investor's future liabilities.

19. The method of claim 1, further comprising:

determining, by the at least one server computing device, the investor's assets are likely to be adequate to pay the investor's future liabilities when the funded ratio is greater than a predetermined funded ratio threshold value, the predetermined funded ratio threshold value being greater than or equal to one;

determining, by the at least one server computing device, the investor's assets are at the second risk of being inadequate to pay the investor's future liabilities when the funded ratio is less than a predetermined significant risk threshold value, the predetermined significant risk threshold value being less than or equal to one; and determining, by the at least one server computing device, the investor's assets are at the first risk of being inadequate to pay the investor's future liabilities when the funded ratio is less than the predetermined funded ratio threshold value and greater than the predetermined significant risk threshold value, the predetermined funded ratio threshold value being greater than the predetermined significant risk threshold value.

20. A system for use with a plurality of client computing devices, the system being configured to display whether a retirement plan is at risk of being underfunded on a results graphical user interface, the system comprising at least one server computing device connected to the plurality of client computing devices by a network, the at least one server computing device comprising:

at least one processor; and memory connected to the at least one processor, the memory comprising computer executable instructions that when executed by the at least one processor, perform a method comprising:

receiving a first request from a requesting one of the plurality of client computing devices over the network, transmitting an input interface over the network to the requesting client computing device in response to the first request, the input interface being configured to receive information identifying an investor's assets and future liabilities, receiving, over the network and from the requesting client computing device, the information identifying the investor's assets and future liabilities entered into the input interface, instructing the requesting client computing device to display the results graphical user interface, displaying, on the results graphical user interface, a net present value of the investor's assets, calculating a net present value of the investor's future liabilities using a mortality table that includes a probability that the investor will live to each of a plurality of ages, displaying, on the results graphical user interface, the net present value of the investor's future liabilities, calculating a funded ratio by dividing the net present value of the investor's assets by the net present value of the investor's future liabilities, displaying, on the results graphical user interface, a graphic representation of the funded ratio, the graphic representation being color coded with a first, second, or third color, the first color indicating the investor's assets are likely to be adequate to pay the investor's future liabilities, the second color indicating a first risk that the investor's assets are inadequate to pay the investor's future liabilities, the third color indicating a second risk that the investor's assets are inadequate to pay the investor's future liabilities, the second risk being greater than the first risk, the first, second, and third colors being different from one another, displaying, on the results graphical user interface, at least one user input allowing a user of the requesting client computing device to modify one or both of the investor's assets or the investor's future liabilities, receiving an indication from the requesting client computing device that the user has selected the at least one user input indicating the user would like to adjust one or both of the investor's assets and the investor's future liabilities, transmitting an adjustment interface to the requesting client computing device in response to the indication, the adjustment interface being configured to receive new information modifying one or both of the investor's assets and the investor's future liabilities, if the new information modified the investor's assets, determining a new net present value of the investor's assets, and replacing the net present value of the investor's assets with the new net present value of the investor's assets, if the new information modified the investor's future liabilities, determining a new net present value of the investor's future liabilities, and replacing the net present value of the investor's future liabilities with the new net present value of the investor's future liabilities, calculating a new funded ratio by dividing the net present value of the investor's assets by the net present value of the investor's future liabilities, instructing the requesting client computing device to display a new results graphical user interface, displaying, on the new results graphical user interface, the net present value of the investor's assets, displaying, on the new results graphical user interface, the net present value of the investor's future liabilities, displaying, on the new results graphical user interface, a new graphic representation of the new funded ratio, the new graphic representation being color coded with one of the first, second, or third colors, and displaying, on the new results graphical user interface, the at least one user input.

21. The system of claim 20, wherein the method further comprises:
receiving an indication from the requesting client computing device that the user would like to evaluate one or more investment strategies,
transmitting an investment strategy interface to the requesting client computing device in response to the indication, the investment strategy interface being configured to receive information identifying one or more investment strategies,
determining, for each of the one or more investment strategies identified in the investment strategy interface, a future value of the investor's assets on a future date, and a future threshold value, the future threshold value being determined at least in part on a portion of the investor's future liabilities due after the future date, and
transmitting an investment results interface to the requesting client computing device, the investment results interface displaying the future value of the investor's assets for each of the one or more investment strategies identified in the investment strategy interface and the future threshold value.

22. The system of claim 21, wherein the future threshold value is a projected market price for an annuity to be purchased at the future date, the annuity being sufficient to pay a portion of the investor's future liabilities occurring after the future date.

23. The system of claim 21, wherein the future threshold value is a projected actuarial net future value on the future date of a portion of the investor's future liabilities occurring after the future date.

24. The system of claim 21, wherein the one or more investment strategies identified in the investment strategy interface comprise a first investment strategy, and
the first investment strategy comprises an asset allocation determined based at least in part on the funded ratio.

25. The system of claim 24, wherein the first investment strategy allocates (a) a first portion of the investor's assets to growth assets if the funded ratio is less than a first threshold value, (2) a second portion of the investor's assets to growth assets if the funded ratio is greater than a second threshold value, and (3) a third portion of the investor's assets to growth assets if the funded ratio is greater than the first threshold value, and less than the second threshold value, the second threshold value being larger than the first threshold value.

26. The system of claim 25, wherein the second portion of the investor's assets is larger than both the first and third portions of the investor's assets, and
the third portion of the investor's assets is larger than the first portion of the investor's assets.

27. The system of claim 21 for use with a set of wealth tables associating a plurality of withdrawal rates and investor ages with asset allocations, wherein the one or more investment strategies identified in the investment strategy interface comprise a first investment strategy,
the first investment strategy comprises an asset allocation determined based at least in part on an age of the investor, and a withdrawal rate for a period,
the withdrawal rate is determined at least in part based on the net present value of the investor's assets and a portion of the investor's future liabilities occurring during the period,
the asset allocation of the first investment strategy for the period is determined by looking up the investor's age and the withdrawal rate in the set of wealth tables, and using, as the asset allocation of the first investment strategy, a looked up asset allocation associated with the investor's age and the withdrawal rate in the set of wealth tables.

28. The system of claim 20, further comprising:
determining the investor's assets are likely to be adequate to pay the investor's future liabilities when the funded ratio is greater than a predetermined funded ratio threshold value, the predetermined funded ratio threshold value being greater than or equal to one;
determining the investor's assets are at the second risk of being inadequate to pay the investor's future liabilities when the funded ratio is less than a predetermined significant risk threshold value, the predetermined significant risk threshold value being less than or equal to one; and
determining the investor's assets are at the first risk of being inadequate to pay the investor's future liabilities when the funded ratio is less than the predetermined funded ratio threshold value and greater than the predetermined significant risk threshold value, the predetermined funded ratio threshold value being greater than the predetermined significant risk threshold value.

29. The system of claim 20, wherein the investor's assets comprise a plurality of financial assets and human capital, and determining the net present value of the investor's assets by:
determining a net present value of each of the plurality of financial assets to obtain a plurality of net present values for the financial assets;
totaling the plurality of net present values to obtain a total net present value of the financial assets;
determining a net present value of the human capital; and
adding the net present value of the human capital to the total net present value of the financial assets.

30. The system of claim 29, wherein the human capital comprises future retirement contributions, and
determining the net present value of the human capital comprises totaling the future retirement contributions discounted at an appropriate interest rate.

31. The system of claim 20, wherein the net present value of the investor's future liabilities is (a) a market price for an annuity with payouts sufficient to pay the investor's future liabilities or (b) an actuarial net present value of the investor's future liabilities.

* * * * *